(12) United States Patent
Gudmundson et al.

(10) Patent No.: US 7,899,232 B2
(45) Date of Patent: Mar. 1, 2011

(54) METHOD AND APPARATUS FOR PROVIDING THREAT IMAGE PROJECTION (TIP) IN A LUGGAGE SCREENING SYSTEM, AND LUGGAGE SCREENING SYSTEM IMPLEMENTING SAME

(75) Inventors: Dan Gudmundson, Québec (CA); Luc Perron, Charlesbourg (CA); Alexandre Filiatrault, Québec (CA); Aidan Doyle, Québec (CA); Michel Bouchard, Sainte-Foy (CA)

(73) Assignee: Optosecurity Inc., Quebec, Quebec (CA)

( * ) Notice: Subject to any disclaimer, the term of this patent is extended or adjusted under 35 U.S.C. 154(b) by 963 days.

(21) Appl. No.: 11/747,639

(22) Filed: May 11, 2007

(65) Prior Publication Data

US 2008/0170660 A1    Jul. 17, 2008

Related U.S. Application Data

(63) Continuation-in-part of application No. 11/431,627, filed on May 11, 2006.

(51) Int. Cl.
G06K 9/00        (2006.01)
G06K 9/62        (2006.01)

(52) U.S. Cl. .................. 382/132; 382/100; 382/275; 382/209; 378/57; 356/240.1

(58) Field of Classification Search ............... 382/100, 382/132, 275, 209; 378/57; 356/240.1
See application file for complete search history.

(56) References Cited

U.S. PATENT DOCUMENTS

| 4,338,626 A | 7/1982 | Lemelson |
|---|---|---|
| 4,379,348 A | 4/1983 | Haas et al. |
| 4,383,327 A | 5/1983 | Kruger |
| 4,470,303 A | 9/1984 | O'Donnell |

(Continued)

FOREIGN PATENT DOCUMENTS

CA        2307439        5/2000

(Continued)

OTHER PUBLICATIONS

H.J. Caufield and W.T. Maloney, Improved discrimination in optical character recognition, 1969, Appl. Opt., 8, p. 2354.

(Continued)

*Primary Examiner*—Bhavesh M Mehta
*Assistant Examiner*—Patrick L Edwards

(57) ABSTRACT

A method and apparatus for testing luggage screening equipment operators is provides. A sequence of images of contents of luggage items derived from a device that scans the luggage items with penetrating radiation are received. The image generation device is characterized by introducing a certain distortion into these images of contents of luggage items. A display device is caused to display images derived from this sequence of images. Occasionally, the display device is caused to show a simulated threat in a luggage item by displaying a combined image derived based at least in part on an image in the sequence of images and a distorted threat image. The distorted threat image was derived by applying a distortion insertion process to a reference threat image wherein the distortion insertion process tends to approximate the certain distortion introduced in the images of contents of luggage items by the device that scans the luggage items with penetrating radiation.

63 Claims, 10 Drawing Sheets

U.S. PATENT DOCUMENTS

| | | |
|---|---|---|
| 4,480,899 A | 11/1984 | Sprague |
| 4,481,575 A | 11/1984 | Bazlen et al. |
| 4,482,958 A | 11/1984 | Nakayama et al. |
| 4,509,075 A | 4/1985 | Simms et al. |
| 4,573,198 A | 2/1986 | Anderson |
| 4,612,666 A | 9/1986 | King |
| 4,637,056 A | 1/1987 | Sherman et al. |
| 4,651,957 A | 3/1987 | Minnich, II |
| 4,653,109 A | 3/1987 | Lemelson et al. |
| 4,722,096 A | 1/1988 | Dietrich et al. |
| 4,724,543 A | 2/1988 | Klevecz et al. |
| 4,725,733 A | 2/1988 | Horman et al. |
| 4,736,399 A | 4/1988 | Okazaki |
| 4,736,401 A | 4/1988 | Donges et al. |
| 4,737,650 A | 4/1988 | West |
| 4,756,015 A | 7/1988 | Doenges et al. |
| 4,759,047 A | 7/1988 | Donges et al. |
| 4,775,895 A | 10/1988 | Traupe et al. |
| 4,783,794 A | 11/1988 | Dietrich |
| 4,788,704 A | 11/1988 | Donges et al. |
| 4,795,253 A | 1/1989 | Sandridge et al. |
| 4,819,188 A | 4/1989 | Matsubara et al. |
| 4,832,447 A | 5/1989 | Javidi |
| 4,837,733 A | 6/1989 | Shiraishi et al. |
| 4,838,644 A | 6/1989 | Ochoa et al. |
| 4,841,554 A | 6/1989 | Doenges et al. |
| 4,849,912 A | 7/1989 | Leberl et al. |
| 4,862,358 A | 8/1989 | Kimura et al. |
| 4,869,574 A | 9/1989 | Hartman |
| 4,870,670 A | 9/1989 | Geus |
| 4,884,289 A | 11/1989 | Glockmann et al. |
| 4,887,899 A | 12/1989 | Hung |
| 4,916,722 A | 4/1990 | Ema |
| 4,955,060 A | 9/1990 | Katsuki et al. |
| 5,003,616 A | 3/1991 | Orita et al. |
| 5,018,178 A | 5/1991 | Katsumata |
| 5,020,111 A | 5/1991 | Weber |
| 5,022,062 A | 6/1991 | Annis |
| 5,034,812 A | 7/1991 | Rawlings |
| 5,041,993 A | 8/1991 | Rawlings |
| 5,056,130 A | 10/1991 | Engel |
| 5,060,249 A | 10/1991 | Eisen et al. |
| 5,063,602 A | 11/1991 | Peppers et al. |
| 5,065,418 A | 11/1991 | Bermbach et al. |
| 5,073,782 A | 12/1991 | Huguenin et al. |
| 5,079,698 A | 1/1992 | Grenier et al. |
| 5,091,924 A | 2/1992 | Bermbach et al. |
| 5,107,351 A | 4/1992 | Leib et al. |
| 5,109,276 A | 4/1992 | Nudelman et al. |
| 5,132,811 A | 7/1992 | Iwaki et al. |
| 5,132,842 A | 7/1992 | Yeh |
| 5,132,998 A | 7/1992 | Tsutsui et al. |
| 5,138,167 A | 8/1992 | Barnes |
| 5,150,229 A | 9/1992 | Takesue et al. |
| 5,179,581 A | 1/1993 | Annis |
| 5,181,234 A | 1/1993 | Smith |
| 5,198,669 A | 3/1993 | Namiki et al. |
| 5,216,541 A | 6/1993 | Takesue et al. |
| 5,239,595 A | 8/1993 | Takemura et al. |
| 5,257,085 A | 10/1993 | Ulich et al. |
| 5,257,322 A | 10/1993 | Matsuoka et al. |
| 5,268,967 A | 12/1993 | Jang et al. |
| 5,283,641 A | 2/1994 | Lemelson |
| 5,297,222 A | 3/1994 | Mori et al. |
| 5,309,244 A | 5/1994 | Katagiri et al. |
| 5,309,523 A | 5/1994 | Iwaki et al. |
| 5,311,359 A | 5/1994 | Lucas et al. |
| 5,319,547 A | 6/1994 | Krug et al. |
| 5,323,472 A | 6/1994 | Falk |
| 5,327,286 A | 7/1994 | Sampsell et al. |
| 5,345,081 A | 9/1994 | Rogers |
| 5,345,173 A | 9/1994 | Bito et al. |
| 5,365,560 A | 11/1994 | Tam |
| 5,365,564 A | 11/1994 | Yashida et al. |
| 5,367,552 A | 11/1994 | Peschmann |
| 5,371,542 A | 12/1994 | Pauli et al. |
| 5,375,156 A | 12/1994 | Kuo-Petravic et al. |
| 5,376,796 A | 12/1994 | Chan et al. |
| 5,379,334 A | 1/1995 | Zimmer et al. |
| 5,379,336 A | 1/1995 | Kramer et al. |
| 5,418,380 A | 5/1995 | Simon et al. |
| 5,420,788 A | 5/1995 | Vissers |
| 5,425,113 A | 6/1995 | Ito |
| 5,428,657 A | 6/1995 | Papanicolopoulos et al. |
| 5,430,787 A | 7/1995 | Norton |
| 5,481,584 A | 1/1996 | Tang et al. |
| 5,481,622 A | 1/1996 | Gerhardt et al. |
| 5,483,569 A | 1/1996 | Annis |
| 5,485,312 A | 1/1996 | Horner et al. |
| 5,490,218 A | 2/1996 | Krug et al. |
| 5,493,444 A | 2/1996 | Khoury et al. |
| 5,506,880 A | 4/1996 | Scardino et al. |
| 5,519,225 A | 5/1996 | Mohr et al. |
| 5,524,133 A | 6/1996 | Neale et al. |
| 5,528,702 A | 6/1996 | Mitsuoka et al. |
| 5,528,703 A | 6/1996 | Lee |
| 5,546,189 A | 8/1996 | Svetkoff et al. |
| 5,568,256 A | 10/1996 | Korner et al. |
| 5,580,471 A | 12/1996 | Fukumoto et al. |
| 5,595,767 A | 1/1997 | Cinquin et al. |
| 5,600,303 A | 2/1997 | Husseiny et al. |
| 5,600,485 A | 2/1997 | Iwaki et al. |
| 5,600,700 A | 2/1997 | Krug et al. |
| 5,604,634 A | 2/1997 | Khoury et al. |
| 5,619,596 A | 4/1997 | Iwaki et al. |
| 5,625,192 A | 4/1997 | Oda et al. |
| 5,625,717 A | 4/1997 | Hashimoto et al. |
| 5,638,420 A | 6/1997 | Armistead |
| 5,642,393 A | 6/1997 | Krug et al. |
| 5,642,394 A | 6/1997 | Rothschild |
| 5,647,018 A | 7/1997 | Benjamin |
| 5,664,574 A | 9/1997 | Chance |
| 5,668,846 A | 9/1997 | Fox et al. |
| 5,680,525 A | 10/1997 | Sakai et al. |
| 5,684,565 A | 11/1997 | Oshida et al. |
| 5,692,028 A | 11/1997 | Geus et al. |
| 5,692,029 A | 11/1997 | Husseiny et al. |
| 5,692,446 A | 12/1997 | Becker et al. |
| 5,699,400 A | 12/1997 | Lee et al. |
| 5,703,921 A | 12/1997 | Fujita et al. |
| 5,706,816 A | 1/1998 | Mochizuki et al. |
| 5,726,449 A | 3/1998 | Yoshiike et al. |
| 5,739,539 A | 4/1998 | Wang et al. |
| 5,745,542 A | 4/1998 | Gordon et al. |
| 5,748,305 A | 5/1998 | Shimono et al. |
| 5,748,697 A | 5/1998 | Tam |
| 5,754,621 A | 5/1998 | Suzuki et al. |
| 5,756,875 A | 5/1998 | Parker et al. |
| 5,757,981 A | 5/1998 | Kawakubo |
| 5,761,334 A | 6/1998 | Nakajima et al. |
| 5,764,683 A | 6/1998 | Swift et al. |
| 5,764,719 A | 6/1998 | Noettling |
| 5,768,334 A | 6/1998 | Maitrejean et al. |
| 5,777,742 A | 7/1998 | Marron |
| 5,778,046 A | 7/1998 | Molloi et al. |
| 5,779,641 A | 7/1998 | Hatfield et al. |
| 5,784,429 A | 7/1998 | Arai |
| 5,786,597 A | 7/1998 | Lingren et al. |
| 5,787,145 A | 7/1998 | Geus |
| 5,794,788 A | 8/1998 | Massen |
| 5,796,802 A | 8/1998 | Gordon |
| 5,796,868 A | 8/1998 | Dutta-Choudhury |
| 5,799,100 A | 8/1998 | Clarke et al. |
| 5,800,355 A | 9/1998 | Hasegawa |

| Patent No. | Date | Inventor |
|---|---|---|
| 5,802,133 A | 9/1998 | Kawai et al. |
| 5,809,171 A | 9/1998 | Neff et al. |
| 5,815,198 A | 9/1998 | Vachtsevanos et al. |
| 5,815,264 A | 9/1998 | Reed et al. |
| 5,828,722 A | 10/1998 | Ploetz et al. |
| 5,828,774 A | 10/1998 | Wang |
| 5,834,153 A | 11/1998 | Hasegawa et al. |
| 5,838,758 A | 11/1998 | Krug et al. |
| 5,838,759 A | 11/1998 | Armistead |
| 5,841,828 A | 11/1998 | Gordon et al. |
| 5,841,907 A | 11/1998 | Javidi et al. |
| 5,850,465 A | 12/1998 | Shimura et al. |
| 5,862,198 A | 1/1999 | Samarasekera et al. |
| 5,862,258 A | 1/1999 | Taylor |
| 5,864,598 A | 1/1999 | Hsieh et al. |
| 5,866,907 A | 2/1999 | Drukier et al. |
| 5,877,849 A | 3/1999 | Ramer et al. |
| 5,881,123 A | 3/1999 | Tam |
| 5,893,095 A | 4/1999 | Jain et al. |
| 5,894,345 A | 4/1999 | Takamoto et al. |
| 5,901,196 A | 5/1999 | Sauer et al. |
| 5,901,198 A | 5/1999 | Crawford et al. |
| 5,903,623 A | 5/1999 | Swift et al. |
| 5,909,285 A | 6/1999 | Beaty et al. |
| 5,909,477 A | 6/1999 | Crawford et al. |
| 5,910,765 A | 6/1999 | Slemon et al. |
| 5,910,973 A | 6/1999 | Grodzins |
| 5,911,139 A | 6/1999 | Jain et al. |
| 5,917,190 A | 6/1999 | Yodh et al. |
| 5,926,568 A | 7/1999 | Chaney et al. |
| 5,940,468 A | 8/1999 | Huang et al. |
| 5,943,388 A | 8/1999 | Tumer |
| 5,951,474 A | 9/1999 | Matsunaga et al. |
| 5,953,452 A | 9/1999 | Boone et al. |
| 5,960,104 A | 9/1999 | Conners et al. |
| 5,974,111 A | 10/1999 | Krug et al. |
| 5,978,440 A | 11/1999 | Kang et al. |
| 5,981,949 A | 11/1999 | Leahy et al. |
| 5,987,095 A | 11/1999 | Chapman et al. |
| 6,005,916 A | 12/1999 | Johnson et al. |
| 6,008,496 A | 12/1999 | Winefordner et al. |
| 6,009,142 A | 12/1999 | Sauer et al. |
| 6,011,620 A | 1/2000 | Sites et al. |
| 6,018,561 A | 1/2000 | Tam |
| 6,018,562 A | 1/2000 | Willson |
| 6,031,890 A | 2/2000 | Bermbach et al. |
| 6,035,014 A | 3/2000 | Hiraoglu et al. |
| 6,043,870 A | 3/2000 | Chen |
| 6,049,381 A | 4/2000 | Reintjes et al. |
| 6,057,761 A | 5/2000 | Yukl |
| 6,057,909 A | 5/2000 | Yahav et al. |
| 6,058,159 A | 5/2000 | Conway et al. |
| 6,060,677 A | 5/2000 | Ulrichsen et al. |
| 6,070,583 A | 6/2000 | Perelman et al. |
| 6,075,591 A | 6/2000 | Vokhmin |
| 6,075,880 A | 6/2000 | Kollhof et al. |
| 6,078,638 A | 6/2000 | Sauer et al. |
| 6,080,994 A | 6/2000 | Carrott et al. |
| 6,081,580 A | 6/2000 | Grodzins et al. |
| 6,084,939 A | 7/2000 | Tamura |
| 6,088,423 A | 7/2000 | Krug et al. |
| 6,094,472 A | 7/2000 | Smith |
| 6,097,427 A | 8/2000 | Dey et al. |
| 6,097,483 A * | 8/2000 | Komatsu .................. 356/237.2 |
| 6,149,300 A | 11/2000 | Greenway et al. |
| 6,153,873 A | 11/2000 | Wolf |
| 6,155,179 A | 12/2000 | Aust et al. |
| 6,157,730 A | 12/2000 | Roever et al. |
| 6,163,403 A | 12/2000 | Carrott et al. |
| 6,175,417 B1 | 1/2001 | Do et al. |
| 6,175,613 B1 | 1/2001 | Boutenko et al. |
| 6,188,747 B1 | 2/2001 | Geus et al. |
| 6,195,413 B1 | 2/2001 | Geus et al. |
| 6,195,444 B1 | 2/2001 | Simanovsky et al. |
| 6,198,795 B1 | 3/2001 | Naumann et al. |
| 6,205,195 B1 | 3/2001 | Lanza |
| 6,205,243 B1 | 3/2001 | Migdal et al. |
| 6,218,943 B1 | 4/2001 | Ellenbogen |
| 6,222,902 B1 | 4/2001 | Lin et al. |
| 6,229,872 B1 | 5/2001 | Amos |
| 6,233,303 B1 | 5/2001 | Tam |
| 6,236,704 B1 | 5/2001 | Navab et al. |
| 6,236,708 B1 | 5/2001 | Lin et al. |
| 6,249,341 B1 | 6/2001 | Basiji et al. |
| 6,252,929 B1 | 6/2001 | Swift et al. |
| 6,256,370 B1 | 7/2001 | Yavuz |
| 6,256,404 B1 | 7/2001 | Gordon et al. |
| 6,263,044 B1 | 7/2001 | Joosten |
| 6,263,231 B1 | 7/2001 | Reitter |
| 6,272,204 B1 | 8/2001 | Amtower et al. |
| 6,272,233 B1 | 8/2001 | Takeo |
| 6,278,760 B1 | 8/2001 | Ogawa et al. |
| 6,288,974 B1 | 9/2001 | Nelson |
| 6,289,235 B1 | 9/2001 | Webber et al. |
| 6,292,260 B1 | 9/2001 | Lin et al. |
| 6,292,530 B1 | 9/2001 | Yavus et al. |
| 6,292,533 B1 | 9/2001 | Swift et al. |
| 6,324,245 B1 | 11/2001 | Tam |
| 6,353,673 B1 | 3/2002 | Shnitser et al. |
| 6,366,638 B1 | 4/2002 | Hsieh et al. |
| 6,370,222 B1 | 4/2002 | Cornick, Jr. |
| 6,373,916 B1 | 4/2002 | Inoue et al. |
| 6,373,970 B1 | 4/2002 | Dong et al. |
| 6,381,297 B1 | 4/2002 | Hsieh |
| 6,388,788 B1 | 5/2002 | Harris et al. |
| 6,403,960 B1 | 6/2002 | Wellnitz et al. |
| 6,404,841 B1 | 6/2002 | Pforr et al. |
| 6,408,042 B1 | 6/2002 | Hsieh |
| 6,415,012 B1 | 7/2002 | Taguchi et al. |
| 6,418,184 B1 | 7/2002 | Wang et al. |
| 6,418,189 B1 | 7/2002 | Schafer |
| 6,424,692 B1 | 7/2002 | Suzuki |
| 6,442,288 B1 | 8/2002 | Haerer et al. |
| 6,445,765 B1 | 9/2002 | Frank et al. |
| 6,448,545 B1 | 9/2002 | Chen |
| 6,453,003 B1 | 9/2002 | Springer et al. |
| 6,459,755 B1 | 10/2002 | Li |
| 6,463,181 B2 | 10/2002 | Duarte |
| 6,473,489 B2 | 10/2002 | Bani-Hashemi et al. |
| 6,477,221 B1 | 11/2002 | Ning |
| 6,480,285 B1 | 11/2002 | Hill |
| 6,480,564 B1 | 11/2002 | Kim et al. |
| 6,483,894 B2 | 11/2002 | Hartick et al. |
| 6,487,307 B1 | 11/2002 | Hennessey et al. |
| 6,502,984 B2 | 1/2003 | Ogura et al. |
| 6,507,025 B1 | 1/2003 | Verbinski et al. |
| 6,507,278 B1 | 1/2003 | Brunetti et al. |
| 6,525,331 B1 | 2/2003 | Ngoi et al. |
| 6,526,120 B1 | 2/2003 | Gray et al. |
| 6,532,276 B1 | 3/2003 | Hartick et al. |
| 6,542,574 B2 | 4/2003 | Grodzins |
| 6,542,578 B2 | 4/2003 | Ries et al. |
| 6,542,579 B1 | 4/2003 | Takasawa |
| 6,542,580 B1 | 4/2003 | Carver et al. |
| 6,542,628 B1 | 4/2003 | Muller et al. |
| 6,549,683 B1 | 4/2003 | Bergeron et al. |
| 6,552,809 B1 | 4/2003 | Bergeron et al. |
| 6,559,769 B2 | 5/2003 | Anthony et al. |
| 6,570,177 B1 | 5/2003 | Struckhoff et al. |
| 6,570,708 B1 | 5/2003 | Bergeron et al. |
| 6,570,951 B1 | 5/2003 | Hsieh |
| 6,570,956 B1 | 5/2003 | Rhee et al. |
| 6,574,296 B2 | 6/2003 | Stierstorfer |
| 6,574,297 B2 | 6/2003 | Tam |
| 6,580,777 B1 | 6/2003 | Ueki et al. |
| 6,580,778 B2 | 6/2003 | Meder |

| | | |
|---|---|---|
| 6,583,895 B1 | 6/2003 | Kuwahara et al. |
| 6,584,170 B2 | 6/2003 | Aust et al. |
| 6,586,193 B2 | 7/2003 | Yguerabide et al. |
| 6,587,575 B1 | 7/2003 | Windham et al. |
| 6,587,595 B1 | 7/2003 | Henkel et al. |
| 6,597,760 B2 | 7/2003 | Beneke et al. |
| 6,603,536 B1 | 8/2003 | Hasson et al. |
| 6,608,921 B1 | 8/2003 | Inoue et al. |
| 6,611,575 B1 | 8/2003 | Alyassin et al. |
| 6,618,466 B1 | 9/2003 | Ning |
| 6,621,887 B2 | 9/2003 | Albagli et al. |
| 6,621,888 B2 | 9/2003 | Grodzins et al. |
| 6,621,925 B1 | 9/2003 | Ohmori et al. |
| 6,628,982 B1 | 9/2003 | Thomas et al. |
| 6,628,983 B1 | 9/2003 | Gagnon |
| 6,654,443 B1 | 11/2003 | Hoffman |
| 6,663,280 B2 | 12/2003 | Doenges |
| 6,665,373 B1 | 12/2003 | Kotowski et al. |
| 6,707,879 B2 | 3/2004 | McClelland et al. |
| 6,714,623 B2 | 3/2004 | Sako et al. |
| 6,721,387 B1 | 4/2004 | Naidu et al. |
| 6,721,391 B2 | 4/2004 | McClelland et al. |
| 6,724,922 B1 | 4/2004 | Vilsmeier |
| 6,731,819 B1 | 5/2004 | Fukushima et al. |
| 6,735,274 B1 | 5/2004 | Zahavi et al. |
| 6,735,279 B1 | 5/2004 | Jacobs et al. |
| 6,738,450 B1 | 5/2004 | Barford |
| 6,744,909 B1 | 6/2004 | Kostrzewski et al. |
| 6,746,864 B1 | 6/2004 | McNeil et al. |
| 6,751,349 B2 | 6/2004 | Matama |
| 6,754,374 B1 | 6/2004 | Miller et al. |
| 6,763,148 B1 | 7/2004 | Sternberg et al. |
| 6,785,410 B2 | 8/2004 | Vining et al. |
| H2110 H | 10/2004 | Newman |
| 6,801,647 B1 | 10/2004 | Arakawa |
| 6,803,997 B2 | 10/2004 | Stanek |
| 6,804,412 B1 | 10/2004 | Wilkinson |
| 6,813,395 B1 | 11/2004 | Kinjo |
| 6,825,854 B1 | 11/2004 | Beneke et al. |
| 6,837,422 B1 | 1/2005 | Meder |
| 6,839,403 B1 | 1/2005 | Kotowski et al. |
| 6,839,406 B2 | 1/2005 | Ries et al. |
| 6,843,599 B2 | 1/2005 | Le et al. |
| 6,856,272 B2 | 2/2005 | Levitan et al. |
| 6,865,287 B1 | 3/2005 | Beneke |
| 6,865,509 B1 | 3/2005 | Hsiung et al. |
| 6,868,138 B2 | 3/2005 | Clinthorne et al. |
| 6,873,261 B2 | 3/2005 | Anthony et al. |
| 6,876,322 B2 | 4/2005 | Keller |
| 6,895,072 B2 | 5/2005 | Schrock et al. |
| 6,895,338 B2 | 5/2005 | Hsiung et al. |
| 6,899,540 B1 | 5/2005 | Neiderman et al. |
| 6,918,541 B2 | 7/2005 | Knowles et al. |
| 6,928,141 B2 | 8/2005 | Carver et al. |
| 6,936,828 B2 | 8/2005 | Saccomanno |
| 6,938,488 B2 | 9/2005 | Diaz et al. |
| 6,940,943 B2 | 9/2005 | Claus et al. |
| 6,950,492 B2 | 9/2005 | Besson |
| 6,952,163 B2 | 10/2005 | Huey et al. |
| 6,970,531 B2 | 11/2005 | Eberhard et al. |
| 6,980,681 B1 | 12/2005 | Hsieh |
| 6,982,643 B2 | 1/2006 | Garfinkle |
| 6,990,171 B2 | 1/2006 | Toth et al. |
| 7,000,827 B2 | 2/2006 | Meder |
| 7,017,256 B2 | 3/2006 | Joly et al. |
| 7,020,241 B2 | 3/2006 | Beneke et al. |
| 7,043,474 B2 | 5/2006 | Mojsilovic et al. |
| 7,045,787 B1 | 5/2006 | Verbinski et al. |
| 7,046,761 B2 | 5/2006 | Ellenbogen et al. |
| 7,050,616 B2 | 5/2006 | Hsieh et al. |
| 7,062,074 B1 | 6/2006 | Beneke |
| 7,065,175 B2 | 6/2006 | Green |
| 7,068,751 B2 | 6/2006 | Toth et al. |
| 7,092,485 B2 | 8/2006 | Kravis |
| 7,098,461 B2 | 8/2006 | Endo |
| 7,099,004 B2 | 8/2006 | Masten |
| 7,099,432 B2 | 8/2006 | Ichihara et al. |
| 7,100,165 B2 | 8/2006 | Eldridge et al. |
| 7,103,137 B2 | 9/2006 | Seppi et al. |
| 7,105,828 B2 | 9/2006 | Unger et al. |
| 7,116,749 B2 | 10/2006 | Besson |
| 7,130,456 B2 | 10/2006 | Hillmann |
| 7,136,716 B2 | 11/2006 | Hsiung et al. |
| 7,139,406 B2 | 11/2006 | McClelland et al. |
| 7,142,633 B2 | 11/2006 | Eberhard et al. |
| 7,154,650 B2 | 12/2006 | Lettington |
| 7,164,750 B2 | 1/2007 | Nabors et al. |
| 7,183,906 B2 | 2/2007 | Zanovitch et al. |
| 7,193,515 B1 | 3/2007 | Roberts et al. |
| 7,212,113 B2 | 5/2007 | Zanovitch |
| 7,212,661 B2 | 5/2007 | Samara et al. |
| 7,233,682 B2 | 6/2007 | Levine |
| 7,244,941 B2 | 7/2007 | Roos et al. |
| 7,257,189 B2 | 8/2007 | Modica et al. |
| 2001/0016030 A1 | 8/2001 | Nicolas et al. |
| 2001/0021013 A1 | 9/2001 | Hecht et al. |
| 2001/0021244 A1 | 9/2001 | Suzuki et al. |
| 2001/0028696 A1 | 10/2001 | Yamada et al. |
| 2001/0033636 A1 | 10/2001 | Hartick et al. |
| 2001/0038681 A1 | 11/2001 | Stanton et al. |
| 2001/0038705 A1 | 11/2001 | Rubbert et al. |
| 2001/0038707 A1 | 11/2001 | Ohara |
| 2001/0048734 A1 | 12/2001 | Uppaluri et al. |
| 2001/0053197 A1 | 12/2001 | Murayama et al. |
| 2002/0001366 A1 | 1/2002 | Tamura et al. |
| 2002/0015475 A1 | 2/2002 | Matsumoto et al. |
| 2002/0016546 A1 | 2/2002 | Cerofolini |
| 2002/0017620 A1 | 2/2002 | Oomori et al. |
| 2002/0018199 A1 | 2/2002 | Blumenfeld et al. |
| 2002/0024016 A1 | 2/2002 | Endo |
| 2002/0027970 A1 | 3/2002 | Chapman et al. |
| 2002/0028994 A1 | 3/2002 | Kamiyama |
| 2002/0031246 A1 | 3/2002 | Kawano |
| 2002/0037068 A1 | 3/2002 | Oikawa |
| 2002/0044691 A1 | 4/2002 | Matsugu |
| 2002/0054694 A1 | 5/2002 | Vachtsevanos et al. |
| 2002/0067259 A1 | 6/2002 | Fufidio et al. |
| 2002/0067793 A1 | 6/2002 | Stierstorfer |
| 2002/0085046 A1 | 7/2002 | Furuta et al. |
| 2002/0088952 A1 | 7/2002 | Rao et al. |
| 2002/0094062 A1 | 7/2002 | Dolazza et al. |
| 2002/0094119 A1 | 7/2002 | Sahadevan |
| 2002/0098518 A1 | 7/2002 | Levinson |
| 2002/0106052 A1 | 8/2002 | Menhardt |
| 2002/0122528 A1 | 9/2002 | Besson |
| 2002/0124664 A1 | 9/2002 | Call et al. |
| 2002/0126800 A1 | 9/2002 | Matsumoto et al. |
| 2002/0127586 A1 | 9/2002 | Mortensen |
| 2002/0141625 A1 | 10/2002 | Nelson |
| 2002/0150200 A1 | 10/2002 | Zonneveld |
| 2002/0161534 A1 | 10/2002 | Adler et al. |
| 2002/0168083 A1 | 11/2002 | Garms et al. |
| 2002/0168657 A1 | 11/2002 | Chen et al. |
| 2002/0172324 A1 | 11/2002 | Ellengogen |
| 2002/0172409 A1 | 11/2002 | Saito et al. |
| 2002/0175921 A1 | 11/2002 | Xu et al. |
| 2002/0176534 A1 | 11/2002 | Meder |
| 2002/0186862 A1 | 12/2002 | McClelland et al. |
| 2002/0188197 A1 | 12/2002 | Bishop et al. |
| 2002/0191209 A1 | 12/2002 | Yasumaru |
| 2003/0012420 A1 | 1/2003 | Verwoerd et al. |
| 2003/0023592 A1 | 1/2003 | Modica et al. |
| 2003/0024315 A1 | 2/2003 | Merkel et al. |
| 2003/0031289 A1 | 2/2003 | Hsieh |
| 2003/0031291 A1 | 2/2003 | Yamamoto et al. |
| 2003/0036006 A1 | 2/2003 | Feke et al. |

| | | |
|---|---|---|
| 2003/0038945 A1 | 2/2003 | Mahner |
| 2003/0072414 A1 | 4/2003 | Sakaida |
| 2003/0072418 A1 | 4/2003 | Albagli et al. |
| 2003/0072484 A1 | 4/2003 | Kokko et al. |
| 2003/0076924 A1 | 4/2003 | Mario et al. |
| 2003/0081720 A1 | 5/2003 | Swift et al. |
| 2003/0081859 A1 | 5/2003 | Kasutani |
| 2003/0082516 A1 | 5/2003 | Straus |
| 2003/0085348 A1 | 5/2003 | Megerle |
| 2003/0085353 A1 | 5/2003 | Almogy et al. |
| 2003/0091145 A1 | 5/2003 | Mohr et al. |
| 2003/0095633 A1 | 5/2003 | Van Woezik |
| 2003/0095692 A1 | 5/2003 | Mundy et al. |
| 2003/0128812 A1 | 7/2003 | Appleby et al. |
| 2003/0138147 A1 | 7/2003 | Ongkojoyo |
| 2003/0148393 A1 | 8/2003 | Woodbury et al. |
| 2003/0149346 A1 | 8/2003 | Arnone et al. |
| 2003/0165213 A1 | 9/2003 | Maglich |
| 2003/0179853 A1 | 9/2003 | Amemiya et al. |
| 2003/0194121 A1 | 10/2003 | Eberhard et al. |
| 2003/0205676 A1 | 11/2003 | Nelson et al. |
| 2003/0206649 A1 | 11/2003 | Moshe |
| 2003/0210139 A1 | 11/2003 | Brooks et al. |
| 2003/0215051 A1 | 11/2003 | Suzuki |
| 2003/0215143 A1 | 11/2003 | Zakrzewski et al. |
| 2003/0231788 A1 | 12/2003 | Yukhin et al. |
| 2003/0231791 A1 | 12/2003 | Torre-Bueno et al. |
| 2004/0012853 A1 | 1/2004 | Garcia et al. |
| 2004/0013239 A1 | 1/2004 | Gregerson et al. |
| 2004/0016271 A1 | 1/2004 | Shah et al. |
| 2004/0017882 A1 | 1/2004 | Misawa et al. |
| 2004/0017883 A1 | 1/2004 | Takagi et al. |
| 2004/0017888 A1 | 1/2004 | Seppi et al. |
| 2004/0017935 A1 | 1/2004 | Avinash et al. |
| 2004/0022425 A1 | 2/2004 | Avinash et al. |
| 2004/0027127 A1 | 2/2004 | Mills |
| 2004/0037462 A1 | 2/2004 | Lewis et al. |
| 2004/0041082 A1 | 3/2004 | Harmon |
| 2004/0051030 A1 | 3/2004 | Olszak et al. |
| 2004/0062342 A1 | 4/2004 | Cahill |
| 2004/0062349 A1 | 4/2004 | Schuster |
| 2004/0062351 A1 | 4/2004 | Yoshioka |
| 2004/0066882 A1 | 4/2004 | Eberhard et al. |
| 2004/0066884 A1 | 4/2004 | Hermann Claus et al. |
| 2004/0066890 A1 | 4/2004 | Dalmijn et al. |
| 2004/0075058 A1 | 4/2004 | Blevis et al. |
| 2004/0080315 A1 | 4/2004 | Beevor et al. |
| 2004/0082846 A1 | 4/2004 | Johnson et al. |
| 2004/0083958 A1 | 5/2004 | Saidman et al. |
| 2004/0086075 A1 | 5/2004 | Hein et al. |
| 2004/0086160 A1 | 5/2004 | Zimmermann |
| 2004/0087844 A1 | 5/2004 | Yen |
| 2004/0102700 A1 | 5/2004 | Asafusa |
| 2004/0109231 A1 | 6/2004 | Haisch et al. |
| 2004/0120857 A1 | 6/2004 | Smith et al. |
| 2004/0141056 A1 | 7/2004 | Izumi et al. |
| 2004/0142386 A1 | 7/2004 | Rigler et al. |
| 2004/0160599 A1 | 8/2004 | Hamamatsu et al. |
| 2004/0161073 A1 | 8/2004 | Nokita |
| 2004/0175041 A1 | 9/2004 | Miller |
| 2004/0176677 A1 | 9/2004 | Hwu et al. |
| 2004/0212492 A1 | 10/2004 | Boesch et al. |
| 2004/0213377 A1 | 10/2004 | Endo |
| 2004/0213600 A1 | 10/2004 | Watanabe et al. |
| 2004/0218729 A1 | 11/2004 | Xue et al. |
| 2004/0225222 A1 | 11/2004 | Zeng et al. |
| 2004/0236520 A1 | 11/2004 | Williams et al. |
| 2004/0240612 A1 | 12/2004 | Suzuki |
| 2004/0247071 A1 | 12/2004 | Dafni |
| 2004/0247171 A1 | 12/2004 | Hashimoto et al. |
| 2004/0252024 A1 | 12/2004 | Huey et al. |
| 2004/0252870 A1 | 12/2004 | Reeves et al. |
| 2004/0253660 A1 | 12/2004 | Gibbs et al. |
| 2004/0258198 A1 | 12/2004 | Carver et al. |
| 2004/0258202 A1 | 12/2004 | Wernick et al. |
| 2004/0263379 A1 | 12/2004 | Keller |
| 2004/0264624 A1 | 12/2004 | Tanaka et al. |
| 2004/0264648 A1 | 12/2004 | Claus et al. |
| 2004/0265175 A1 | 12/2004 | Witty et al. |
| 2005/0008119 A1 | 1/2005 | McClelland et al. |
| 2005/0008203 A1 | 1/2005 | Dixon |
| 2005/0017181 A1 | 1/2005 | Kearfott et al. |
| 2005/0018812 A1 | 1/2005 | Wolfs |
| 2005/0025280 A1 | 2/2005 | Schulte |
| 2005/0025350 A1 | 2/2005 | Engelbart et al. |
| 2005/0031069 A1 | 2/2005 | Kaucic et al. |
| 2005/0053307 A1 | 3/2005 | Nose et al. |
| 2005/0057354 A1 | 3/2005 | Jenkins et al. |
| 2005/0058242 A1 | 3/2005 | Peschmann |
| 2005/0058350 A1 | 3/2005 | Dugan et al. |
| 2005/0061955 A1 | 3/2005 | Endo |
| 2005/0069085 A1 | 3/2005 | Lewis |
| 2005/0074088 A1 | 4/2005 | Ichihara et al. |
| 2005/0085721 A1 | 4/2005 | Fauver et al. |
| 2005/0094856 A1 | 5/2005 | Warren |
| 2005/0098728 A1 | 5/2005 | Alfano et al. |
| 2005/0105680 A1 | 5/2005 | Nabors et al. |
| 2005/0110672 A1 | 5/2005 | Cardiasmenos et al. |
| 2005/0111618 A1 | 5/2005 | Sommer, Jr. et al. |
| 2005/0113961 A1 | 5/2005 | Sabol et al. |
| 2005/0117693 A1 | 6/2005 | Miyano |
| 2005/0117700 A1 | 6/2005 | Peschmann |
| 2005/0123093 A1 | 6/2005 | Lawaczeck et al. |
| 2005/0123174 A1 | 6/2005 | Gorsky et al. |
| 2005/0128069 A1 | 6/2005 | Skatter |
| 2005/0133708 A1 | 6/2005 | Eberhard et al. |
| 2005/0147199 A1 | 7/2005 | Dunham et al. |
| 2005/0153356 A1 | 7/2005 | Okawa et al. |
| 2005/0163354 A1 | 7/2005 | Ziegler |
| 2005/0173284 A1 | 8/2005 | Ambrefe, Jr. |
| 2005/0189412 A1 | 9/2005 | Hudnut et al. |
| 2005/0190882 A1 | 9/2005 | McGuire |
| 2005/0206514 A1 | 9/2005 | Zanovitch et al. |
| 2005/0207655 A1 | 9/2005 | Chopra et al. |
| 2005/0212913 A1 | 9/2005 | Richter |
| 2005/0219523 A1 | 10/2005 | Onuma et al. |
| 2005/0220264 A1 | 10/2005 | Homegger |
| 2005/0226375 A1 | 10/2005 | Eberhard et al. |
| 2005/0240858 A1 | 10/2005 | Croft et al. |
| 2005/0248450 A1 | 11/2005 | Zanovitch |
| 2005/0249416 A1 | 11/2005 | Leue et al. |
| 2005/0251397 A1 | 11/2005 | Zanovitch et al. |
| 2005/0251398 A1 | 11/2005 | Zanovitch et al. |
| 2005/0259868 A1 | 11/2005 | Sones |
| 2005/0265517 A1 | 12/2005 | Gary |
| 2005/0271184 A1 | 12/2005 | Ovadia |
| 2005/0275831 A1 | 12/2005 | Silver |
| 2005/0276443 A1 | 12/2005 | Slamani et al. |
| 2005/0279936 A1 | 12/2005 | Litman et al. |
| 2005/0283079 A1 | 12/2005 | Steen et al. |
| 2006/0000911 A1 | 1/2006 | Stekel |
| 2006/0002504 A1 | 1/2006 | De Man et al. |
| 2006/0008054 A1 | 1/2006 | Ohara |
| 2006/0009269 A1 | 1/2006 | Hoskinson et al. |
| 2006/0013455 A1 | 1/2006 | Watson et al. |
| 2006/0013464 A1 | 1/2006 | Ramsay et al. |
| 2006/0017605 A1 | 1/2006 | Lovberg et al. |
| 2006/0018434 A1 | 1/2006 | Jacobs et al. |
| 2006/0018517 A1 | 1/2006 | Chen et al. |
| 2006/0019409 A1 | 1/2006 | Nelson et al. |
| 2006/0034503 A1 | 2/2006 | Shimayama |
| 2006/0036167 A1 | 2/2006 | Shina |
| 2006/0045235 A1 | 3/2006 | Bruder et al. |
| 2006/0045323 A1 | 3/2006 | Ateya |
| 2006/0064246 A1 | 3/2006 | Medberry et al. |
| 2006/0065844 A1 | 3/2006 | Zelakiewicz et al. |

| | | | |
|---|---|---|---|
| 2006/0072702 A1 | 4/2006 | Chapman | |
| 2006/0083418 A1 | 4/2006 | Watson et al. | |
| 2006/0084872 A1 | 4/2006 | Ichikawa et al. | |
| 2006/0086794 A1 | 4/2006 | Knowles et al. | |
| 2006/0093088 A1 | 5/2006 | Sowerby et al. | |
| 2006/0098773 A1 | 5/2006 | Peschmann | |
| 2006/0098866 A1 | 5/2006 | Whitson et al. | |
| 2006/0115109 A1 | 6/2006 | Whitson et al. | |
| 2006/0116566 A1 | 6/2006 | Bruijns | |
| 2006/0119837 A1 | 6/2006 | Raguin et al. | |
| 2006/0133650 A1 | 6/2006 | Xie et al. | |
| 2006/0133659 A1 | 6/2006 | Hammond | |
| 2006/0142662 A1 | 6/2006 | Van Beek | |
| 2006/0142984 A1 | 6/2006 | Weese et al. | |
| 2006/0173268 A1 | 8/2006 | Mullick et al. | |
| 2006/0176062 A1 | 8/2006 | Yang et al. | |
| 2006/0203960 A1 | 9/2006 | Schlomka et al. | |
| 2006/0204080 A1 | 9/2006 | Sones et al. | |
| 2006/0215811 A1 | 9/2006 | Modica et al. | |
| 2006/0255929 A1 | 11/2006 | Zanovitch et al. | |
| 2006/0257005 A1 | 11/2006 | Bergeron et al. | |
| 2006/0262902 A1 | 11/2006 | Wattenburg | |
| 2006/0269135 A1 | 11/2006 | Ramsay et al. | |
| 2006/0273257 A1 | 12/2006 | Roos et al. | |
| 2006/0274916 A1 | 12/2006 | Chan et al. | |
| 2006/0282886 A1 | 12/2006 | Gaug | |
| 2007/0003122 A1 | 1/2007 | Sirohey et al. | |
| 2007/0041612 A1 | 2/2007 | Perron et al. | |
| 2007/0041613 A1 | 2/2007 | Perron et al. | |
| 2007/0058037 A1 | 3/2007 | Bergeron et al. | |
| 2007/0147585 A1 | 6/2007 | Eilbert et al. | |
| 2007/0168467 A1 | 7/2007 | Hu et al. | |
| 2007/0195994 A1 | 8/2007 | McClelland et al. | |
| 2007/0200566 A1 | 8/2007 | Clark et al. | |
| 2007/0206719 A1 | 9/2007 | Suryanarayanan et al. | |
| 2007/0210921 A1 | 9/2007 | Volpi et al. | |
| 2007/0269005 A1* | 11/2007 | Chalmers et al. | 378/57 |
| 2008/0236275 A1 | 10/2008 | Breed et al. | |
| 2008/0260097 A1 | 10/2008 | Anwar et al. | |

FOREIGN PATENT DOCUMENTS

| | | |
|---|---|---|
| CA | 2319958 | 9/2000 |
| CA | 2574402 | 1/2006 |
| EP | 0 577 380 A1 | 1/1994 |
| WO | WO 02/082290 A1 | 10/2002 |
| WO | WO 03/069498 A1 | 8/2003 |
| WO | WO 03/107113 A2 | 12/2003 |
| WO | WO 2005/086616 A2 | 9/2005 |
| WO | PCT/CA2005/000716 | 2/2006 |
| WO | PCT/CA/2005/001930 | 4/2006 |
| WO | PCT/CA/2006/000655 | 8/2006 |
| WO | PCT/CA/2006/000751 | 8/2006 |
| WO | WO 2006/119603 A1 | 11/2006 |
| WO | PCT/CA2007/000779 | 8/2007 |
| WO | PCT/CA2007/000840 | 8/2007 |
| WO | PCT/CA2005/000716 | 11/2007 |
| WO | PCT/CA2005/001930 | 11/2007 |
| WO | PCT/CA2006/000655 | 11/2007 |
| WO | PCT/CA2006/000751 | 11/2007 |
| WO | PCT/CA2007/001297 | 11/2007 |
| WO | PCT/CA2007/001298 | 11/2007 |
| WO | PCT/CA2007/001658 | 1/2008 |
| WO | PCT/CA2007/001749 | 1/2008 |
| WO | WO2008/009134 A1 | 1/2008 |
| WO | WO2008/034232 A1 | 3/2008 |
| WO | WO2008/040119 A1 | 4/2008 |
| WO | PCT/CA2008/000275 | 10/2009 |

OTHER PUBLICATIONS

Mahalanobis, A. et al., Minimum average correlation energy filters, Sep. 1, 1987, Appl. Opt. 26 No. 17, pp. 3633-3640.

Joseph L. Horner et al., Phase-only matched filtering, Mar. 15, 1994, Appl. Opt. vol. 23 No. 6, pp. 812-816.

Benjamin R., Object-based 3D X-ray imaging for second-line security screening, 1995, Conf. Publ. No. 408, Londonn, UK: IEE, pp. 310-313, Abstract.

Andre Morin et al., Optical character recognition (OCR) in uncontrolled environnments using optical correlators, 1999, SPIE Int., pp. 346-356.

PinPoint TM Threat Identification Software dated Jul. 25, 2005 of URL: http://vvww.guardiantechintl.com/security.php?npage=pinpoint, 4 pages.

Gregor McDonald, Fast Pattern Recognition, QinetiQ ltd 2003.

Secure Flight passenger screening program, Oct. 28, 2005, http://www.globalsecurity.org/securiy/systems/passenger_screen.htm, 6 pages.

Security technology overview: Advanced vehicle verification & threat identification, www.optosecurity.com and www.extremeCTV.com, 1 page.

B.V.K. Vijaya Kumar et al., Spatial Frequency Domain Image Processing for Biometric Recognition, 2002, pp. I-53-I-56, vol. 1, IEEE ICIP, Pittsburgh, PA, USA.

eXaminer 3DX, Explosives Detection System, L3 Communications, Security & Detection Systems, Nov. 8-9, 2005.

Airport Magazine, Solutions, Products, Services, vol. 7, Mar. 2006, selected pages.

PCT/CA2008/000275 (ISR), OPTOSecurity Inc.

Office Action mailed on Feb. 13, 2009 in connection with U.S. Appl. No. 11/268,749, 7 pages.

Office Action mailed on May 28, 2009 in connection with U.S. Appl. No. 11/268,749, 18 pages.

Office Action mailed on Jul. 2, 2009 in connection with U.S. Appl. No. 11/431,627, 34 pages.

Office Action mailed on Dec. 2, 2008 in connection with Canadian Patent Application 2,546,296, 2 pages.

Office Action mailed on Jun. 29, 2009 in connection with Canadian Patent Application 2,651,131, 3 pages.

Office Action mailed on Apr. 16, 2010 in connection with U.S. Appl. No. 11/431,627, 46 pages.

* cited by examiner

METHOD AND APPARATUS FOR PROVIDING THREAT IMAGE PROJECTION (TIP) IN A LUGGAGE SCREENING SYSTEM, AND LUGGAGE SCREENING SYSTEM IMPLEMENTING SAME

CROSS-REFERENCE TO RELATED APPLICATIONS

This application is a continuation-in-part claiming the benefit under 35 USC §120 of U.S. patent application Ser. No. 11/431,627 entitled "APPARATUS, METHOD AND SYSTEM FOR SCREENING RECEPTACLES AND PERSONS, HAVING IMAGE DISTORTION CORRECTION FUNCTIONALITY", filed on May 11, 2006 by L. Perron et al., and presently pending, the contents of which are incorporated herein by reference.

FIELD OF THE INVENTION

The present invention relates generally to security systems and, more particularly, to methods and systems for screening luggage items having functionality for testing luggage screening equipment operators by displaying simulated threats in images conveying contents of luggage items.

BACKGROUND

Typically, security screening systems in airports make use of devices generating penetrating radiation, such as x-ray devices, to scan individual pieces of luggage to generate an image conveying the contents of the luggage. The image is displayed on a screen and is examined by a human operator whose task it is to detect and possibly identify, on the basis of the image, potentially threatening objects located in the luggage.

A deficiency with conventional security screening systems is that the job of luggage screening can become repetitious, leading to lapses in attention during which potentially dangerous items may be inadvertently allowed on board an aircraft for example.

In order to alleviate at least in part the above described deficiency, luggage screening systems are sometimes equipped with threat image projection (TIP) systems adapted for displaying an image of a piece of luggage with a simulated threat appearing thereon.

These threat image projection (TIP) systems allow merging two images: one image of a threat (e.g.: handgun, gun part, knife, improvised explosive device, etc.) based on stored images with one "live" image of a piece of luggage passing on the belt of the screening systems (such as an x-ray machine). The combined image is then displayed on the usual security screening monitor to the luggage screener who is then expected to process the luggage in accordance with the usual procedure when an actual threat is detected in the luggage. The functionality of such threat image projection systems is used during normal operation for benchmarking purposes, to keep luggage screeners alert, for maintaining the proficiency of experienced users and for training new users. An example of such a system is described in U.S. Pat. No. 6,899,540 issued to Neiderman, et al. on May 31, 2005 and entitled "Threat Image Projection System". The contents of the above referenced document are incorporated herein by reference. In Neiderman et al., a computer system which causes a luggage screening monitor to show computer-generated (i.e. simulated) contraband items in a piece of luggage is described. This is done by either overlaying a computer-generated image of a contraband or other item onto the image of the luggage being screened, or by substituting the image of an entire piece of luggage which contains contraband for the image of the luggage being screened. The system also checks whether the contraband item (threat) fits into the current luggage being screened in order to ensure that a large threat is not projected into a small bag (e.g., a purse), thus cueing the screener that the threat is simulated. If the system determines that the selected contraband item (threat) does not fit in the luggage, the simulated contraband item is not displayed.

A deficiency in systems of the type described above is that the images shown to the user containing the computer-generated (i.e. simulated) contraband item (e.g. threat) do not convincingly convey that what the user is looking at is a real contraband item in the piece of luggage being screened. Frequently, the manner in which the images are merged together leads screeners to conclude that the threat displayed in the image of the piece of luggage was computer-generated as the result of the threat image projection (TIP) image-merging feature rather than a real threat.

Consequently, there is a need in the industry for providing a method and system for performing threat image projection (TIP) that alleviate at least in part the deficiencies of the prior art.

SUMMARY OF THE INVENTION

In accordance with a broad aspect, the present application seeks to provide a method for testing luggage screening equipment operators. The method comprises receiving a sequence of images of contents of luggage items derived from a device that scans the luggage items with penetrating radiation, the device being characterized by introducing a certain distortion into the images of contents of luggage items. The method also comprises causing a display device to display images derived from the sequence of images of contents of luggage items. The method also comprises occasionally causing the display device to show a simulated threat in a luggage item by displaying a combined image. The combined image is derived based at least in part on an image in the sequence of images and a distorted threat image, the distorted threat image having been derived by applying a distortion insertion process to a reference threat image to introduce a distortion in the reference threat image. The distortion insertion process tends to approximate the certain distortion introduced in the images of contents of luggage items by the device that scans the luggage items with penetrating radiation.

For the purpose of this specification, the expression "luggage item" is used to broadly describe luggage, suitcases, handbags, backpacks, briefcases, boxes, parcels or any other similar type of item suitable for containing objects therein.

Advantageously, the above-described method allows taking into account distortions introduced by the device that scans the luggage items with penetrating radiation when displaying a combined image conveying a representation of a luggage item with a simulated threat contained therein.

In accordance with a specific example of implementation, the method comprises occasionally causing the display device to show a same simulated threat positioned at different perceived heights in luggage items. This is effected by displaying combined images derived based at least in part on images in the sequence of images and a group of distorted threat images. The distorted threat images in the group are associated to respective heights and are derived by applying distinct distortion insertion processes to a reference threat image to introduce distortions in a reference threat image, wherein the distinct distortion insertion processes are each associated to respective heights.

In accordance with another broad aspect, the invention provides an apparatus for testing luggage screening equipment operators in accordance with the above-described method.

In accordance with another broad aspect, the invention provides a computer readable storage medium including a program element suitable for execution by a CPU for implementing an apparatus for testing luggage screening equipment operators in accordance with the above described method.

In accordance with another broad aspect, the present application seeks to provide a method for testing luggage screening equipment operators. The method comprises receiving a sequence of images of contents of luggage items derived from a device that scans the luggage items with penetrating radiation, the device being characterized by introducing a certain distortion into the images of contents of luggage items. The method also comprises causing a display device to display images derived from the sequence of images of contents of luggage items. The method also comprises occasionally causing the display device to show a simulated threat in a luggage item by:
  applying a distortion insertion process to a reference threat image to derive a distorted threat image, the distortion insertion process tending to approximate the certain distortion introduced in the images of contents of luggage items by the device that scans the luggage items with penetrating radiation;
  deriving a combined image conveying a simulated threat in the luggage item based at least in part on an image in the sequence of images and the distorted threat image; and
  causing the display device to display the combined image.

Advantageously, by applying a distortion insertion process to a reference threat image associated to a given threat and then using this distorted threat image in the generation of a combined image for showing a simulation of that given threat, a more realistic representation of a luggage item that would have truly contained that given threat can be obtained.

In accordance with a specific example of implementation, the method comprises processing the image of contents of the luggage item to derive spatial information associated to the luggage item and conditioning the distortion insertion process at least in part based on the spatial information.

In accordance with a specific example of implementation, the method comprises providing a set of original threat images associated to respective potential threats and selecting at least one image from the set of original threat images as the reference threat image. The step of selecting may be effected using any suitable rule. In a specific example of implementation, selecting at least one image from the plurality of original threat images as the reference threat image is conditioned at least in part based on the spatial information associated to the luggage item. In a non-limiting example, wherein the spatial information associated to the luggage item includes size information, the method comprises selecting at least one image from the plurality of threat images as the original threat image based at least in part on the size information associated to the luggage item.

In accordance with a specific example of implementation, the method comprises providing an original threat image associated to a threat and assigning positioning information to the original threat image to derive the reference threat image. The positioning information assigned to the original threat image to derive the reference threat image is conditioned at least in part based on the spatial information associated to the luggage item.

In accordance with a specific example of implementation, the reference threat image includes intensity data for a set of coordinates, and the distorted threat image is defined by modified intensity data for a set of new coordinates. Applying a distortion insertion process comprises applying an image transformation to the intensity data for the set of coordinates to derive the modified intensity data for the new coordinates. The image transformation involves processing of a data structure representative of an inferred spatial transformation applied by the device that scans the luggage item with penetrating radiation. The inferred spatial transformation may be two-dimensional or three-dimensional. In a non-limiting example of implementation, the data structure is characterized by a set of parameters derived from registration of observed coordinates with respect to a set of reference coordinates.

In accordance with another specific example of implementation, the method comprises occasionally causing the display device to show a same simulated threat positioned at different perceived heights in luggage items. The method comprises applying distortion insertion processes to a reference threat image to derive a plurality of distorted threat images, the distortion insertion processes being associated to respective heights such that the distorted threat images in the plurality of distorted threat images are associated to respective perceived heights. The method comprises deriving combined images conveying the same simulated threat positioned at different perceived heights in luggage items based at least in part on images in the sequence of images and the plurality of distorted threat images and causing a display device to display at least some of the combined images.

In accordance with another broad aspect, the invention provides an apparatus for testing luggage screening equipment operators in accordance with the above-described method.

In accordance with another broad aspect, the invention provides a computer readable storage medium including a program element suitable for execution by a CPU, the program element implementing an apparatus for testing luggage screening equipment operators in accordance with the above described method.

In accordance with another aspect, the invention provides a system for screening luggage items. The system comprises an image generation device, a display device and an apparatus including functionality for testing luggage screening equipment operators in communication with the image generation device and the display device. The image generation device is for scanning luggage items with penetrating radiation to generate a sequence of images of contents of the luggage items. The image generation device is characterized by introducing a certain distortion into the images of contents of luggage items. The apparatus includes functionality for testing luggage screening equipment operators and comprises an input, and output and a processing unit. The input is for receiving the sequence of images of contents of luggage items. The output is for releasing an output signal suitable for causing the display device to display images derived from the sequence of images of contents of luggage items. The processing unit is operative for occasionally causing the output signal released at the output to convey a simulated threat in a luggage item by conveying a combined image. The combined image is derived based at least in part on an image in the sequence of images and a distorted threat image, wherein the distorted threat image was derived by applying a distortion insertion process to a reference threat image to introduce a distortion in the reference threat image. The distortion insertion process applied is such that it tends to approximate the certain distortion introduced in the images of contents of luggage items by the image generation device.

In accordance with another broad aspect, the invention provides a client-server system for implementing a process for testing luggage screening equipment operators. The client-server system comprising a client system and a server system operative to exchange messages there between over a data network. The server system stores a program element for execution by a CPU. The program element comprises a first program element component executed on the server system for receiving a sequence of images of contents of luggage items derived from a device that scans the luggage items with penetrating radiation. The device that scans the luggage items with penetrating radiation is characterized by introducing a certain distortion into the images of contents of luggage items. The program element also comprises a second program element component executed on the server system for generating messages for transmission to the client system for causing a display device in communication with the client system to display images derived from the sequence of images of contents of luggage items. The second program element component is operative for occasionally generating messages for causing the display device in communication with the client system to show a simulated threat in a luggage item by conveying a combined image. The combined image is derived based at least in part on an image in the sequence of images and a distorted threat image. The distorted threat image was derived by applying a distortion insertion process to a reference threat image to introduce a distortion in the reference threat image, wherein the distortion insertion process approximates the certain distortion introduced in the images of contents of luggage items by the device that scans the luggage items with penetrating radiation.

In accordance with another broad aspect, the invention provides an apparatus for testing luggage screening equipment operators. The apparatus comprises means for receiving a sequence of images of contents of luggage items derived from a device that scans the luggage items with penetrating radiation. The apparatus also comprises means for causing a display device to display images derived from the sequence of images of contents of luggage items and means for occasionally causing the display device to show a simulated threat in a luggage item by conveying a combined image. The combined image is derived based at least in part on an image in the sequence of images and a distorted threat image, the distorted threat image having been derived by applying a distortion insertion process to a reference threat image to introduce a distortion in the reference threat image. The distortion insertion process approximates the certain distortion introduced in the images of contents of luggage items by the device that scans the luggage items with penetrating radiation.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

A detailed description of embodiments of the present invention is provided herein below, by way of example only, with reference to the accompanying drawings, in which.

Figure 1:
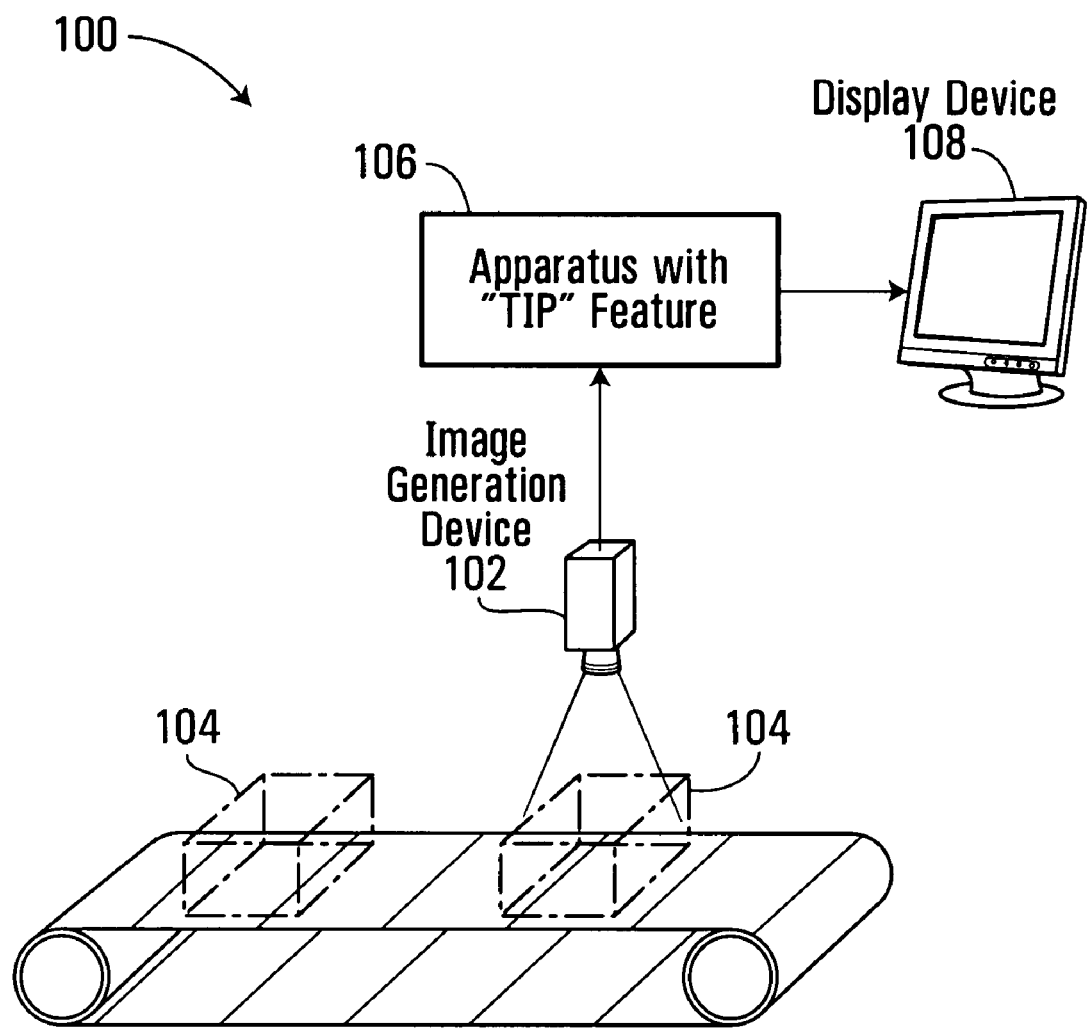
FIG. 1 is a high-level block diagram of a system for screening a luggage item in accordance with a specific example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Shown in FIG. 1 is a system 100 for screening a luggage item 104 providing threat image projection (TIP) functionality in accordance with a specific example of implementation of the present invention. The system 100 includes an image generation device 102, a display device 108 and an apparatus 106.

The image generation device 102 scans luggage items with penetrating radiation to generate a sequence of images of contents of the luggage items, the image generation device being characterized by introducing a certain distortion into the images of contents of luggage items. Specific examples of image generation devices that can be used include, without being limited to, x-ray, gamma ray, computed tomography (CT scans) and millimeter wave devices. Such devices are known in the art and as such will not be described further here. The images generated by the image generation device 102 may be two-dimensional (2D) or three-dimensional (3D) without detracting from the spirit of the invention. In a non-limiting example of implementation, the image generation device 102 is a conventional x-ray machine and the images in the sequence of images of the contents of the luggage items 104 are x-ray images of the luggage items 104 generated by the x-ray machine. In another non-limiting example of implementation, the image generation device 102 is a multi-view x-ray machine. The sequence of images of contents of luggage items 104 generated by the image generation device 102 may be in any suitable format such as, without limitation, VGA, SVGA, XGA, JPEG, GIF, TIFF and bitmap amongst others. Alternatively, the images may be in a proprietary image format. It will be appreciate that the actual format is not critical to the invention. Preferably, the sequence of images of contents of luggage items 104 is in a format that can be displayed on a display screen.

The image generation device 102 introduces a certain distortion into the images it generates, herein referred to as the distortion signature of the image generation device 102. More specifically, different objects in the luggage items 104 may be distorted to different degrees when captured in an image by the image generation device 102. The amplitude and nature of the distortion introduced by the image generation device 102 vary in space, both in the XY-plane (location of the luggage item 104 on the conveyor belt 120) and in z-height (position of an object in the luggage item 104 with regards to the z-axis which sets the distance between the object in question and the image generation device 102). As such, a given image generation device 102 will be characterized by introducing a certain distortion into the images of contents of luggage items it generates. In examples of implementation where the image generation device 102 is described as an x-ray machine the distortion introduced in the images is caused by the x-ray source's and detectors arrays' locations and the angle between them.

The apparatus 106 receives the sequence of images of contents of luggage items generated by the image generation device 102 and releases output signals for causing a display device, such as display device 108, to display images derived from the sequence of images of contents of luggage items. The apparatus 106 also includes functionality for testing luggage screening equipment operators by occasionally causing the output signal released to convey a simulated threat in a luggage item. The simulated threat in a luggage item is conveyed by a combined image derived based at least in part on an image in the sequence of images generated by the image generation device 102 and on a distorted threat image. The distorted threat image is derived by applying to a reference threat image a distortion insertion process that tends to approximate the certain distortion introduced by the image generation device 102. The manner in which the distorted image and the combined image can be generated will be described later on in the specification.

The display device 108 displays information to a luggage screening equipment operator in visual format. The display device 108 may be embodied as any suitable device including, without being limited to, a display screen of a computer terminal and a display screen of a portable display device. The display device 108 receives from the apparatus 106 signals suitable for causing the display device 108 to display images derived from the sequence of images of contents of luggage items generated by the image generation device 102. As will be described in detail later on in the specification, certain signals received from the apparatus 106 convey combined images for showing a simulated threat in a given luggage item.

Figure 2:
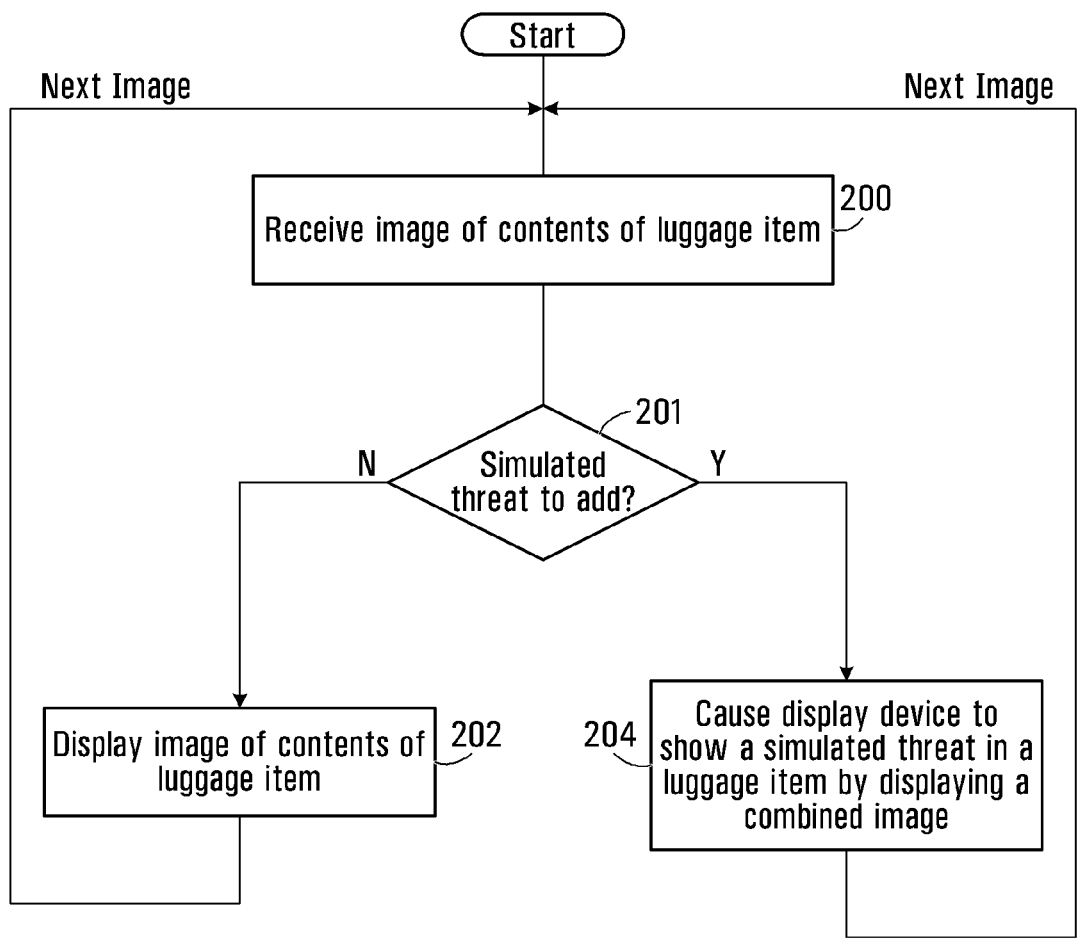
FIG. 2 shows a process for testing luggage screening equipment operators in accordance with a specific example of implementation of the present invention.

A high level representation of a process for testing luggage screening equipment operators implemented by the system 100 is depicted in FIG. 2 of the drawings.

At step 200, an image of contents of a luggage item 104 is obtained by the image generation device 102 (shown in FIG. 1) and provided to the apparatus 106.

At step 201, a decision is made by the apparatus 106 as to whether a simulated threat should be added to the image received at step 200. The decision as to whether a threat should be added may be based on any suitable decision rule. For example, the decision rules may be based on some desired frequency of simulated presence of a threat, may be based on a suitable random function, may be periodic, and/or may be conditioned based on external factors. External factors may include for example, an identity associated to the luggage screening equipment operator making use of the system and a security alert level amongst others.

If step 201 is answered in the negative in that no simulated threat should be added to the image received at step 200, the system proceeds to step 202. At step 202, the apparatus 106 (shown in FIG. 1) releases an output signal for causing the display device 108 (shown in FIG. 1) to convey the image of contents of luggage item received at step 200 without the addition of a simulated threat. The system then returns to step 200 once again where a new image of contents of a luggage item is obtained from the image generation device 102.

If step 201 is answered in the affirmative in that a simulated threat should be added to the image received at step 200, the system proceeds to step 204. At step 204 the apparatus 106 releases an output signal for causing the display device 108 (both shown in FIG. 1) to show a simulated threat in a luggage item by displaying a combined image. The apparatus 106 derives the combined image based at least in part on the image received at step 200 and a distorted threat image. The distorted threat image is derived by applying a distortion insertion process to a reference threat image to introduce a distortion in that reference threat image, wherein the distortion insertion process tends to approximate the certain distortion introduced by the image generation device 102 (shown in FIG. 1). The distorted threat image used in the generation of the combined image may either be pre-computed and stored on a computer readable storage medium accessible by the apparatus 106 or, alternatively, may be derived by the apparatus 106 as part of the process for deriving the combined image. The system then returns to step 200 once again where a new image of contents of a luggage item is received obtained by the image generation device 102.

Advantageously, the system 100 allows a more realistic simulation of a threat in a luggage item to be presented to a luggage screening equipment operator by attempting to compensate for the distortion introduced by the image generation device 102 during the generation of the combined image.

An embodiment of apparatus 106 will now be described in greater detail with reference to FIG. 3.

Apparatus 106

As depicted, the apparatus 106 includes an input 302, an output 304 and a processing unit 330 in communication with the input 302 and the output 304. The first input 302 is for receiving images of contents of luggage items from the image generation device 102 (shown in FIG. 1). The output 304 is for releasing an output signal suitable for causing the display device 108 (shown in FIG. 1) to display images derived based on images of contents of luggage items received at input 302.

As shown, the processing unit 106 comprises a plurality of functional elements including an image display control module 306 and a distorted threat image generation module 308.

The distorted threat image generation module 308 is adapted for releasing to the image control module 306 a distorted threat image 326. In the embodiment shown in FIG.

3, the distorted threat image generation module 308 makes use of information conveyed by the image of contents of a luggage item received at input 302 to generate the distorted threat image 326. Optionally, the distorted threat image generation module 308 is adapted for releasing a threat image selection failure signal in cases where a suitable a distorted threat image could not be generated.

The image display control module 306 is adapted for causing the output signal released at output 304 to convey either one of the image of contents of a luggage item received at input 302 or a combined image conveying a simulated threat in the luggage item. In the latter case, the control module 306 derives the combined image at least in part based on the image received at input 302 and a distorted threat image received from the distorted threat image generation module 308. The image display control module 306 is responsive to receipt of a threat image selection failure signal for causing the output signal released at output 304 to convey the image of contents of a luggage item received at input 302 without the addition of a simulated threat.

In a specific example of implementation, the display control module 306 is adapted for selectively issuing a control signal 342 to the distorted threat image generation module 308 for causing the latter to provide a distorted threat image 326. In such an implementation, the distorted threat image generation module 308 is responsive to the control signal 342 from the image display control module 306 for releasing a distorted threat image 326 to the image display control module 306. Alternatively, the distorted threat image generation module 308 is adapted for automatically generating a distorted threat image 326 upon receipt of a new image of contents of a luggage item received at input 302. In such an alternative, the control signal 342 may be omitted.

Any suitable method for generating a combined image based on the image received at input 302 and the distorted threat image 326 may be used such that the resulting combined image conveying the presence of a simulated threat in the luggage item. In a non-limiting example, the combined image is generated by overlaying the distorted threat image 326 onto the image received at input 302.

In an alternative example of implementation, where the image received at input 302 and the distorted threat image are x-ray images, the display control module 306 is adapted to derive the combined image by performing a combination of the attenuation information conveyed in the image received at input 302 and the attenuation information conveyed in the distorted threat image 326. In this specific example, the resulting combined image is derived based on the true energy levels in the image received at input 302 and in the distorted threat image (high-energy level E1 and low-energy level E2). Advantageously, this alternative method allows generating a combined image that takes into account compound material effects. In other words, the combined image when displayed on display device 108 (shown in FIG. 1) to the luggage screening equipment operators will show that the simulated threat is impacted by the presence of other objects that are located above or underneath it in the luggage item.

It will be appreciated, in light of the above description, that other suitable methods for deriving the combined image at least on part based in the image received at input 302 and the distorted threat image 326 may be used without detracting from the spirit of the invention.

Figure 3:
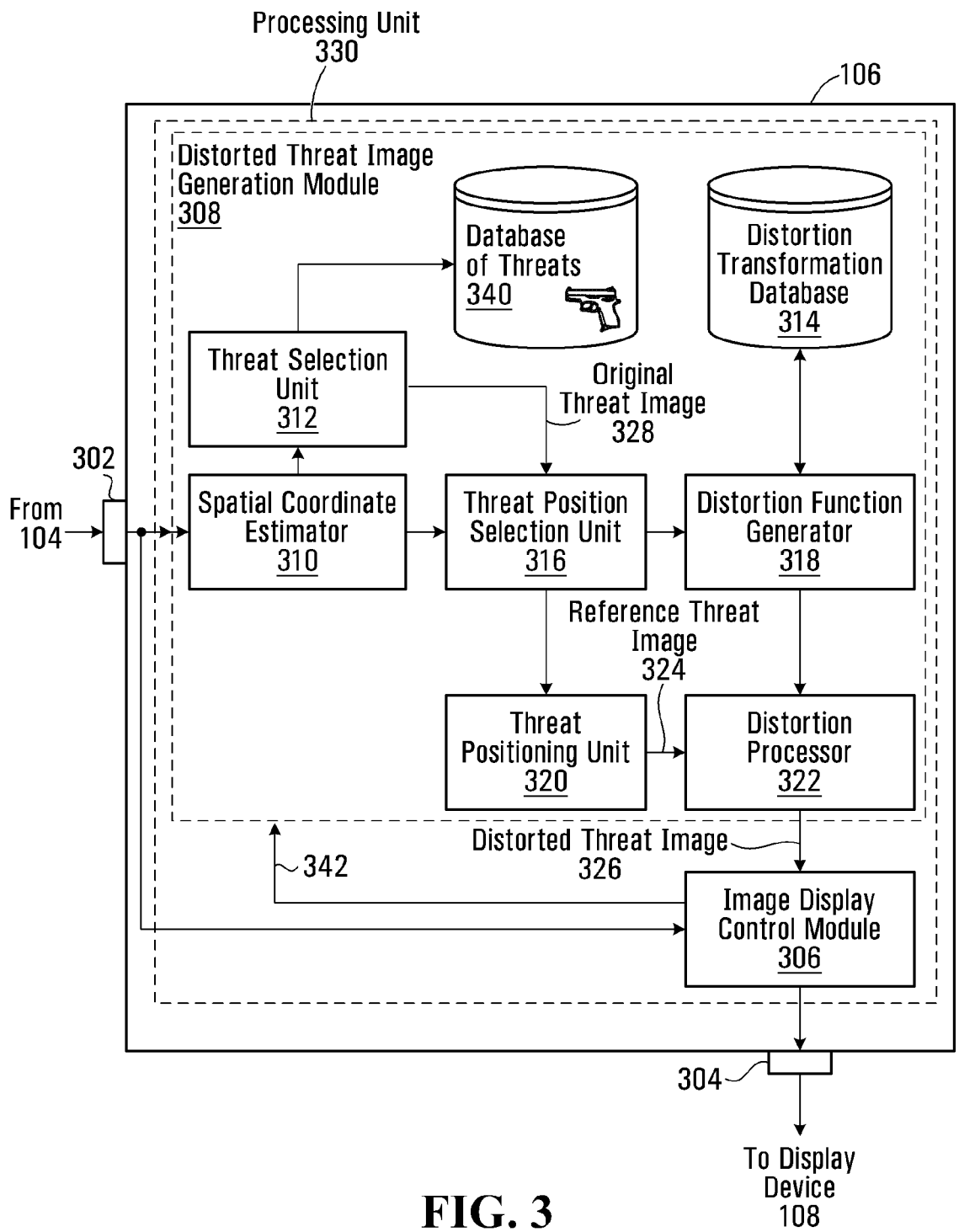
FIG. 3 is a functional block diagram of a apparatus providing threat image projection (TIP) functionality suitable for use in the system shown in FIG. 1 in accordance with a specific example of implementation of the present invention.

In the specific example of implementation depicted in FIG. 3, the distorted threat image generation module 308 includes a spatial coordinate estimator 310, a threat selection unit 312, a threat position selection unit 316, a threat positioning unit 320, a distortion function generator 318 and a distortion processor 322. The distorted threat image generation module 308 may also include a database of threats 340 and a distortion database 314.

Database of Threats 340

The database of threats 340 includes a memory unit for storing a set of original threat images associated to respective potential threats whose presence in luggage items the system 100 (shown in FIG. 1) is designed to simulate. Examples of potential threats to which original threat images in the database of threats may be associated include, without being limited to, weapons (e.g. guns, knives and ammunition) and forbidden objects (e.g. containers of liquid, aerosol cans, lighters, detonators).

It will be appreciated certain embodiments of the database of threats 340 may include a single original threat image, which would allow the system 100 (shown in FIG. 1) to simulate a single potential threat in luggage items. However, practical implementations of the system 100 (shown in FIG. 1) will most likely find it beneficial to include in the database of threats 340 original threat images associated to multiple potential threats in order to provide a system capable of simulating different types of potential threats in luggage items.

In a specific example of implementation, the images in the set of original threat images in the database 340 may be derived by an image generation device using a similar type of penetrating radiation as the image generation device 102 depicted in FIG. 1. For example, where the image generation device 102 depicted in FIG. 1 is an x-ray machine, the images in the database 340 are x-ray images of the respective potential threat to which they are associated and are preferably generated by a device similar to image generation device 102.

It will be appreciated that the image generation device used for the purpose of generating the set of original threat images in the database 340 need not be the same device as the image generation device 102 used in the system 100 and may even be a device manufactured by a different entity. For example, the image generation device used for the purpose of generating the set of original threat images in the database 340 will most likely be characterized by introducing a certain distortion into the original threat images it generated. For the purpose of simplicity, let us refer to this certain distortion as a first distortion signature. The image generation device 102 used in the system 100 is also characterized by introducing a certain distortion into the images of contents of luggage items it generates. For the purpose of simplicity, let us refer to this other certain distortion as a second distortion signature. The first distortion signature and the second distortion signature may be substantially the same or may be different.

In a specific example of implementation, the original threat images in the database of threats 340 have been pre-processed to remove therefrom at least in part the distortion introduced by the image generation device used for the purpose of generating the set of original threat images in the database 340. As such, the original threat images in the database 340 can be considered to be "normalized" images that have been rendered substantially independent from the distortion signature characterizing the image generation device that generated them. Any suitable method for correction distortion in a scanned image may be used. An example of such a method suitable for correcting distortion introduced by an image generation device is described in co-pending U.S. patent application Ser. No. 11/431,627 entitled "APPARATUS, METHOD AND SYSTEM FOR SCREENING RECEPTACLES AND PERSONS, HAVING IMAGE DISTORTION CORRECTION FUNCTIONALITY", filed on May 11, 2006 by L. Perron et al. and published under publication no. 20070041612A1 on Feb. 22, 2007. The contents of the above referenced document are incorporated herein by reference. Advantageously, by storing "normalized" images in database 340, the latter may be used in connection with systems including image generation devices characterized by distinct distortion signatures without requiring the systems to be adapted to the distortion signature of the image generation device that generated the database 340. In addition, by making the set of original threat images in the database 340 substantially independent from the distortion signature of the image generation device that generated them, the update of the database 340 may be made easier. For instance, new threat images to be added to the database 340 need not be generated by an image generation device characterized by the same the distortion signature as the image generation device that generated the threat images already in the database.

For the purpose of the present description, we will describe an implementation where the threat images in the database of threats 340 are "normalized" image, i.e. substantially rendered independent from the distortion signature of the image generation device that generated the image. It will become apparent to the person skilled in the art in light of the present description how the distortion transformation database 314 can be modified in implementations where the images in the database 240 are not "normalized" images.

In addition, although the database 340 has been shown in FIG. 3 to be a component of apparatus 106, it will be appreciated that in certain embodiments the database 340 may be a component in communication with but separate from apparatus 106 and that such implementations do not detract from the spirit of the invention. In addition, it will also be appreciated that in certain implementations where the database 340 is a component separate from apparatus 106, the database 340 may be shared between multiple apparatuses 106 without detracting from the spirit of the invention.

Distortion Transformation Database 314

One recalls that the image generation device 102 (shown in FIG. 1) introduces distortion into the images of contents of the receptacle 104.

The distortion transformation database 314 stores information conveying characteristics of the distortion introduced by the image generation device 102 into the images of contents of luggage items. For the purpose of this description, we will refer to the distortion introduced by the image generation device 102 into the images of contents of luggage items as the distortion signature of the image generation device 102. Typically, different image generation device 102 will have different distortion signatures. In other words, different image generation devices will typically introduce different amounts and types of distortions into the images they generate. As such, the distortion transformation database 314 stores information associated to image generation devices having a certain distortion signature, such as for example a certain specific manufacturer model (or make) of image generation device. Where the apparatus 106 is adapted to be used with image generation devices having different distortion signatures, respective distortion transformation databases are provided for each distortion signature.

In a specific example of implementation, the distortion transformation database 314 stores information characterizing a distortion insertion process that tends to approximate the certain distortion introduced in the images of contents of luggage items by the image generation device 102. When this distortion insertion process is applied to an image of an object, the distortion insertion process mimics the effect of the image generation device 102 by introducing therein a distortion based on the distortion signature of the image generation device 102.

In a specific practical example of implementation, the distortion transformation database 314 includes a memory unit storing a transformation data structure denoted as T*, where T* is an inferred spatial transformation. In a specific implementation, T* includes a plurality of entries, denoted $T_H^*$, wherein each $T_H^*$ is an inferred spatial transformation associated to a respective height (z-height) H. It will therefore be appreciated that, where T* includes $T_H^*$ for different values of H (i.e. different heights), the inferred spatial transformation T* is considered a three-dimensional spatial transformation comprised of multiple inferred two-dimensional spatial transformations $T_H^*$. In cases where an inferred spatial transformation is provided for only one height, T* is a two-dimensional spatial transformation.

An example of the manner in which the transformation data structure denoted T* can be derived will now be described.

One could model the distortion introduced by the image generation device 102 as a spatial transformation T on a "true" (undistorted) image to arrive at a corresponding image generated by the image generation device 102. Thus, T represents a spatial transformation that models the distortion affecting a certain object having a given shape and location in a "true" (undistorted) image, resulting in that certain object's "distorted" shape and location in an image of that object that would be generated by the image generation device 102. Thus, to derive a simulation of an image that would have been generated by the image generation device 102 based in a "true" (undistorted) image, it is reasonable to want to make the distortion insertion process to be applied to that "true" (undistorted) image to resemble T as closely as possible.

It will be appreciated that the amplitude and nature of the distortion introduced by the image generation device 102 vary in space, both in the XY-plane (location of the luggage item 104 on the conveyor belt 120) and in z-height (position of an object in the luggage item 104 with regards to the z-axis which sets the distance between the object in question and the image generation device 102). As such it will be appreciated that characteristics of the spatial transformation T will vary not only according the position of the object in the XY-plane but will also vary according to different heights (z-heights).

Thus, one can denote the spatial transformation for a given candidate height H by $T_H$, which therefore models the distortion affecting objects located at the candidate height H when scanned by the image generation device 102.

Now, although the exact $T_H$ is not known, it may be inferred. The inferred version of $T_H$ is denoted $T_H^*$ and is hereinafter referred to as an "inferred spatial transformation" for a given candidate height H. Basically, $T_H^*$ can be defined as a data structure that represents an estimate of $T_H$. Although the number of possible heights that an object may occupy is a continuous variable, it may be possible to granularize this number to a limited set of "candidate heights" (e.g., such as 5-10) without introducing a noticeable error. Moreover, since in a Threat Image Projection (TIP) context it is possible to control the selection of the height at which a threat image will be inserted, that selection may be made to correspond to a "candidate height" for which a spatial transformation $T_H^*$ has been determined. Of course, the number of candidate heights in a given embodiment may be as low as one, while the upper bound on the number of candidate heights is not particularly limited.

The data structure that represents the inferred spatial transformation $T_H^*$ for a given candidate height H may be characterized by a set of parameters. The set of parameters may be derived from registration of observed coordinates with respect to a set of reference coordinates. More specifically, the set of parameters can be derived from the coordinates of a set of "control points" in both an image generated by the image generation device 102 and an "true" image for that candidate height. A "control point" corresponds to a picture element that occurs at a known location in the "true" image (defining the reference coordinates) for a given candidate height H, and whose "distorted" position can be located in the image generated by the image generation device 102 (defining the observed coordinates).

Figure 7:
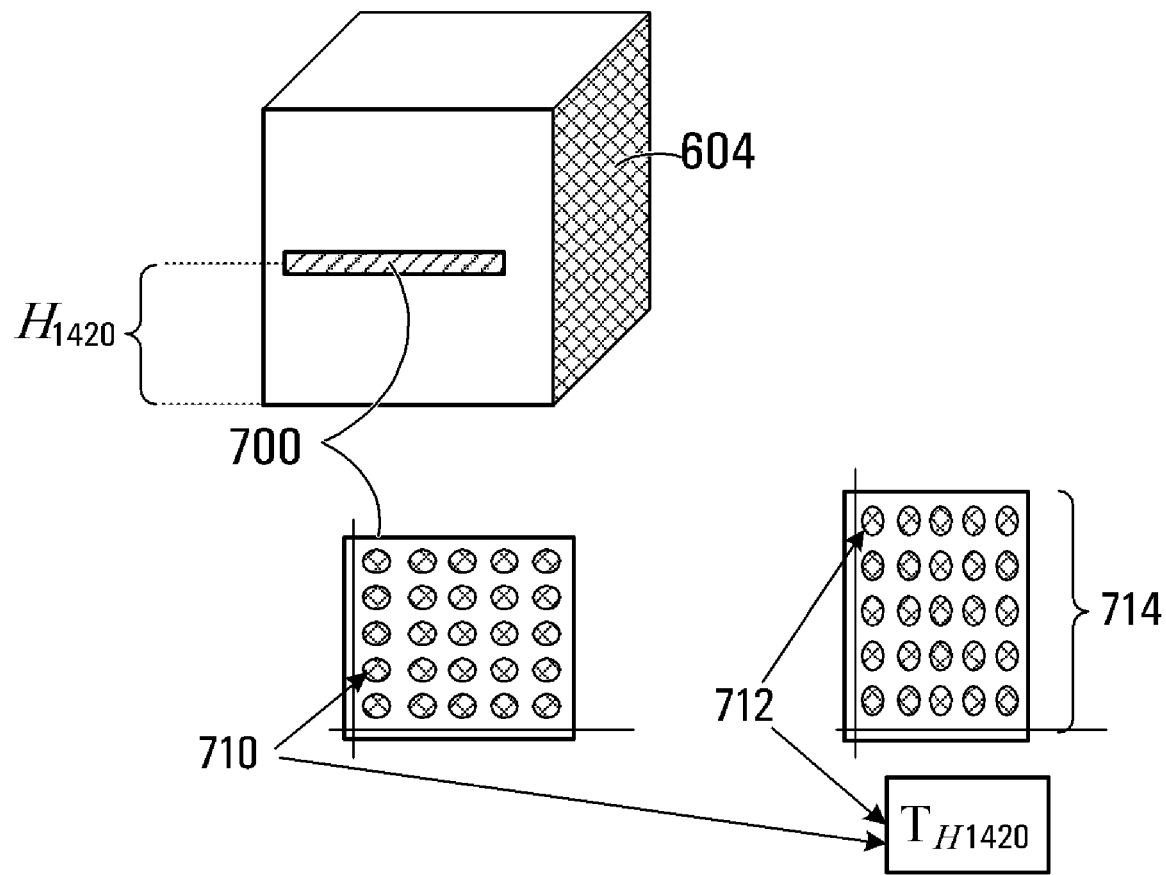
FIG. 7 diagrammatically illustrates a template for use in a registration process in order to model the distortion introduced by an image generation device in accordance with a specific example of implementation of the present invention.

In one specific non-limiting embodiment, to obtain control points specific to a given image generation device 102, and with reference to FIG. 7, one can use a template 700 having a set of spaced apart holes 710 at known locations in the horizontal and vertical directions. The template is placed at a given candidate height $H_{1420}$. One then acquires an input image 714, from which control points 712 (i.e., the holes 710 present at known locations in the template 700) are identified in the input image 714. This may also be referred to as "a registration process". Having performed the registration process on the input image 714 that was derived from the template 700, one obtains $T_{H1420}^*$, the inferred spatial transformation for the height $H_{1420}$.

To obtain the inferred spatial transformation $T_H^*$ for a given candidate height H, one may utilize a "transformation model". The transformation model that is used may fall into one or more of the following non-limiting categories, depending on the type of distortion that is sought to be corrected:

linear conformal;
affine;
projective
polynomial warping (first order, second order, etc.);
piecewise linear;
local weighted mean;
etc.

The use of the function cp2tform in the Image Processing Toolbox of Matlab® (available from Mathworks Inc.) is particularly suitable for the computation of inferred spatial transformations such as $T_H^*$ based on coordinates for a set of control points. Other techniques will now be apparent to persons skilled in the art to which the present invention pertains. The above process can be repeated several times, for different candidate heights, thus obtaining $T_H^*$ for various candidate heights.

The $T_H^*$ for various candidate heights derived in the manner described above are combined to form transformation data structure T* which is then stored on a memory unit as part of distortion transformation database 314.

Figure 6:
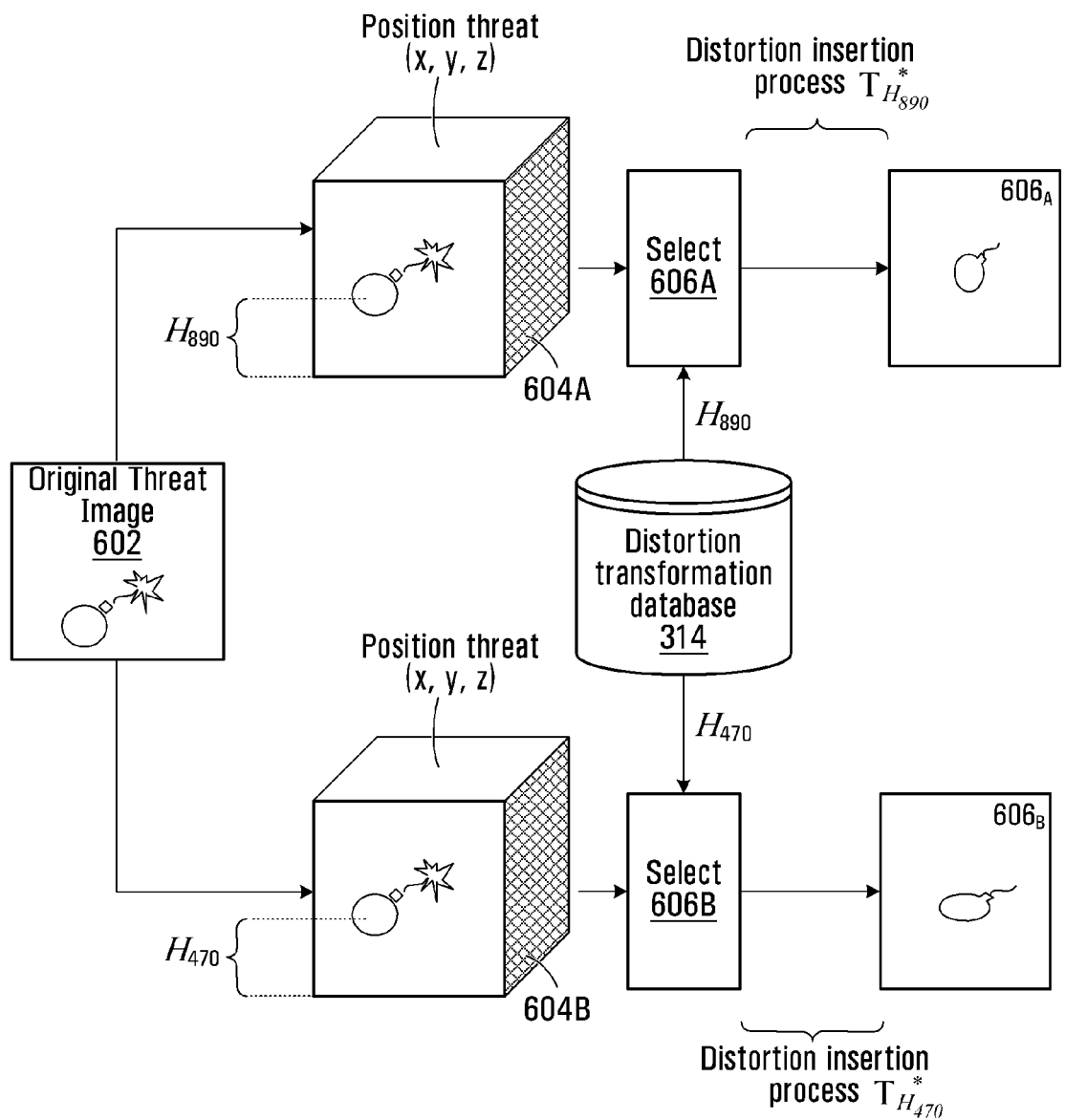
FIG. 6 diagrammatically illustrates the effect of applying distortion insertion processes to a original threat image to generate distorted threat images.

To better illustrate the manner in which transformation data structure T* can be used to derive a simulation of an image that would have been generated by the image generation device 102 based in a "true" (undistorted) image, an example will be described with reference to FIG. 6.

Block 602 is a graphical representation of an original threat image. The original threat image may be derived for example from a database of threat images.

Blocks 604a and 604b are graphical representations of the original threat image repositioned in a three-dimensional space (X, Y, Z-height) at locations at which a threat image is to be inserted in the combined images. The repositioned original threat images 604a and 604b are the reference images to which a distortion insertion process will be applied. Block 604a depicts a first reference image positioned at Z-height $H_{890}$ while block 604b depicts a second reference image positioned at Z-height $H_{470}$.

Based on the Z-height information, $H_{890}$ and $H_{470}$, blocks 606a and 606b select from the distortion transformation database 314 the inferred spatial transformations $T_H^*$ corresponding to heights $H_{890}$ and $H_{470}$. Assuming that $T_H^*$ for $H_{890}$ and $H_{470}$ can be retrieved from distortion transformation database 314, one applies the image transformation $T_H^*$ to the reference threat images 604a and 604b in order to obtain the distorted threat images 606a and 606b. Distorted threat images 606a is associated to z-height $H_{890}$ and distorted threat images 606b is associated to z-height $H_{470}$. Hence an image of a simulated threat can be positioned at different heights in luggage items. Different distortion insertion processes associated to respective heights are applied to a reference threat image to derive a plurality of distorted threat images.

The use of the function imtransform in the Image Processing Toolbox of Matlab® (available from Mathworks Inc.) is particularly suitable for the computation of an output image (such as the distorted images 606a and 606b) based on an input image (such as the reference threat images 604a and 604b) and an inferred spatial transformation such as $T_H^*$. Other techniques will now be apparent to persons skilled in the art to which the present invention pertains.

As was the case for database 340, although the database 314 has been shown in FIG. 3 to be a component of apparatus 106, it will be appreciated that in certain embodiments the database 314 may be a component in communication with but separate from apparatus 106 and that such implementations do not detract from the spirit of the invention. In addition, it will also be appreciated that in certain implementations where the database 314 is a component separate from apparatus 106, the database 314 may be shared between multiple apparatuses 106 without detracting from the spirit of the invention.

Spatial Coordinate Estimator 310

The spatial coordinate estimator 310 is adapted for processing the image of contents of a luggage item received from input 302 to derive spatial information associated to the luggage item. The spatial information generated provides information related to the boundaries of the luggage item. Such information related to the boundaries of the luggage item may include, without being limited to, position information and size information associated to the luggage item. In a specific example of implementation, the position information includes boundaries of a luggage item in the XY-plane (location of the luggage item 104 on the conveyor belt 120) and in z-height (height of the boundaries of the luggage item 104 with regards to the z-axis which sets the distance between the boundaries of the luggage item 104 and the image generation device 102). Any suitable image processing method for deriving the boundaries of the luggage items in an image may be used. It will be readily appreciated that where the image of contents of a luggage item received at input 302 includes a representation of multiple luggage items, spatial information associated to each of the respective luggage items in the image may be generated by the spatial coordinate estimator 310. For the purpose of simplicity, we will describe the case where the image of contents of a luggage item received at input 302 include a representation of contents of a single luggage item.

The spatial coordinate estimator 310 releases the spatial information conveying boundary information associated to the luggage item in the image received from input 302.

The Threat Selection Unit 312

The threat selection unit 312 selects one or more original threat images from the set of original threat images in the database of threats 340 and releases the selected one or more original threat images as signal 328.

The threat selection unit 312 may make use of any suitable set of threat image selection rules to effect the selection of a given threat image from the database of threats 340. Such threat image selection rules may for example, cycle through the original threat images in the database of threats 340 so that the various original threat image are presented to the user in some pre-determined order. Alternatively, the threat image selection rules may provide that original threat images in the database of threats 340 are selected according to respective frequencies such that a given original threat image is selected more (or less) frequently than another original threat image. Alternatively still, the threat image selection rules may provide for a pseudo random selection of an original threat image from the set of original threat images in the database of threats 340. Advantageously, by providing for a pseudo random selection, the selected pattern of threat images varies over time and should not easily be discernable by a luggage screening equipment operator using the system.

Preferably, the threat selection unit 312 conditions the selection of the original threat image at least in part based on the spatial information associated to the luggage item received from the spatial coordinate estimator 310. As described previously, the spatial information associated to the luggage item received from the spatial coordinate estimator 310 provides information related to the boundaries of the luggage item depicted in the image received at input 302.

In a specific example of implementation, the threat selection unit 312 effects an initial selection of an original threat image from the database of threats 340. The threat object selection unit 312 then verifies whether the selected original threat image can be made to fit within the luggage item depicted in the image received at input 302 based on the spatial information received from the spatial coordinate estimator 310. Any suitable image processing method for verifying whether an object fits within a defined boundary may be used to effect this verification. Such methods are known in the art of image processing and as such will not be described further here.

If the threat object selection unit 312 determines that the selected original threat image can be made to fit within the luggage item, the threat object selection unit 312 releases the selected original threat image 328 to the threat position selection unit 316.

If the threat object selection unit 312 determines that the selected original threat image cannot be made to fit within the luggage item, the threat object selection unit 312 selects another original threat image from the database 340 and repeats the verification of whether the newly selected original threat image can be made to fit within the luggage item. The threat object selection unit 312 repeats the process of selecting an original threat image from the database 340 and verifying whether the selected object can be made to fit within the luggage item until:

either a selected original threat image that can be made to fit within the luggage item is found; or
a termination condition is reached.

The termination condition may be reached for any number of suitable reasons. As an example, a termination condition may be reached when a maximum number of selections of original threat images has been reached and has failed to result in a selected original threat image that will fit into the luggage item. The maximum number of selections of original threat images should be selected such as not to delay the display of an image conveying contents of luggage items on the display device 108 by an unreasonable amount of time. If a termination condition is reached, the threat selection unit 312 issues a threat image selection failure signal conveying that the selection process has failed to result in the selection of an original threat image. The threat image selection failure signal is conveyed to the image display control module 306. In response to receipt of a threat image selection failure signal, the image display control module 306 causes the output signal released at output 304 to convey the image of contents of a luggage item received at input 302 without the addition of a simulated threat.

Optionally, the threat selection unit 312 uses size information conveyed by the spatial information associated to the luggage item and received from the spatial coordinate estimator to effect a pre-selection of objects from the database of threats 340. In a first example, prior to initiating the process described above, the threat selection unit 312 uses size information conveyed by the spatial information associated to the luggage to effect a pre-selection of objects from the database of threats 340. In this manner, threat objects in the database of threats 340 that have a size (such as a length, width, height and/or volume) that is larger than that of the luggage item, may be eliminated by the pre-selection step. The remaining threat objects in the database of threats 340 can then be processed to select one or more original threat images on the basis of selection rules of the type described above. In a second example, prior to initiating the selection process described above, the threat selection unit 312 uses size information conveyed by the spatial information associated to the luggage to determine whether the luggage item has a size that is at least as large as a pre-determined minimum size. If the luggage item has a size that is smaller that the pre-determined minimum size, the threat selection unit issues a threat image selection failure signal conveying that the selection process has failed to result in the selection of an original threat image. If the threat selection unit 312 determines that the luggage item has a size that is at least as large as the pre-determined minimum size, the threat selection unit 312 proceeds to select one or more original threat images on the basis of selection rules of the type described above.

It will be readily apparent to the person skilled in the art that the above described embodiment have been described for the purpose of illustration and that other suitable manners of effecting a selection of a threat image from a database of threats may be envisaged without detracting from the spirit of the invention.

The Threat Position Selection Unit 316

The threat position selection unit 316 is adapted to derive positioning information to be assigned to the selected original threat image 328 received from the threat selection unit 316. This positioning information allows a same threat image stored in the database of threats 340 to be positioned in a plurality of different locations in the images conveyed by the output signal released at out put 304. The derived position information is released to the threat positioning unit 320 and to the distortion function generator 318.

In a specific example of implementation, the position information includes positioning data in the XY-plane and in z-height.

The threat position selection unit 316 may make use of any suitable set of threat position selection rules to effect the selection of a given position for the selected threat image 328 received from the threat selection unit 312.

Such threat position selection rules may for example, cycle through a set of pre-determined positions so that the threat images are presented to the user in some pre-determined set of positions. Alternatively, the threat position selection rules may provide that positions are selected according to respective frequencies such that threat images are placed in certain positions more (or less) frequently than in other positions. Alternatively still, the threat position selection rules may provide for a pseudo random selection of position. Advantageously, by providing for a pseudo random selection of the original threat image, the selected pattern of positions for the threat images varies over time and should not easily be discernable by a luggage screening equipment operator using the system.

Most preferably, the threat position selection rules are such that they make use of the spatial information conveying boundary information associated to the luggage item in the image received from input 302 and released by the spatial coordinate estimator 310. Any suitable image processing method for positioning an object within a defined boundary may be used to effect the positioning selection. Such methods are known in the art of image processing and as such will not be described further here. By providing spatial information conveying boundary information associated to the luggage item in the XY-plane and in z-height and by generating positioning information for the threat image in the XY-plane and in z-height, the selected threat image can be positioned such as convey a simulated threat located within the luggage item. This is particularly advantageous where the image of contents of a luggage item received at input 302 and the threat image selected from the database 340 are three-dimensional (3D) images.

The Threat Positioning Unit 320

The threat positioning unit 320 receives the positioning information from the threat position selection unit 316 and assigns the positioning information to the original threat image to derive the reference threat image 324. The reference threat image 324 is released to the distortion processor 322.

The assigning of the positioning information to the original threat image includes modifying the original threat image according to the positioning information so that the image of the threat appears at a different location in the reference image. Said otherwise, the reference threat image 324 is a repositioned version of the original threat image 328. Any suitable image processing method for positioning an image based on desired positioning information may be used. Such methods are known in the art of image processing and as such will not be described further here.

In a non-limiting specific example of implementation, the assigning of the positioning information to the original threat image includes modifying the original threat image according to the XY-plane positioning information.

In another alternative embodiment, not shown in the figures, the database of threats 340 stores sets of original threat images, where each original threat image in a given set is associated to the same threat in a respective position in the XY-plane. In such an alternative embodiment, the threat positioning unit 320 may be omitted and threat position selection unit 316 may be limited to selecting a z-height position. In such a case, the threat selection unit 312 is modified to release a reference threat image 324 to the distortion processor 322 and the threat position selection unit 316 may be limited to selecting a z-height position and to provide the latter to the distortion function generator 318.

The Distortion Function Generator 318

The distortion function generator 318 is adapted for accessing the distortion transformation database 314 to select therefrom a distortion insertion process to be applied to the reference threat image 324. The selected distortion insertion process is then released and provided to the distortion processor 322.

As described above, the amplitude and nature of the distortion introduced by the image generation device 102 vary in space, both in the XY-plane and in z-height. The distortion function generator 318 receives the position information derived by the threat position selection unit 316 and conditions the distortion insertion process based at least in part on the positioning information.

In the specific example of implementation described, the distortion transformation database 314 includes a data structures storing a transformation data structure denoted as T*, where T* includes a plurality of entries, denoted $T_H^*$, wherein each $T_H^*$ is an inferred spatial transformation associated to a respective height (z-height) H. The distortion function generator 318 is adapted for selecting from the distortion transformation database 314 a certain inferred spatial transformation $T_{H'}^*$ corresponding to z-height H'. Z-height H' is the height for which a spatial transformation is present in the database 314 that is in proximity to the height conveyed by the positioning information derived by the threat position selection unit 316.

The Distortion Processor 322

The distortion processor 322 receives the reference threat image 324 from the threat positioning unit 320 and the selected distortion insertion process from the distortion function generator 318. The distortion processor 322 processes the reference threat image 324 by applying the selected distortion insertion process to introduce in reference threat image 324 a distortion tending to approximate the certain distortion introduced in the images of contents of luggage items by the image generation device 102.

In a specific example of implementation, the certain spatial transformation $T_{H'}^*$ received from the distortion function generator 318 is applied to the reference threat image 324 received from the threat positioning unit 320 to derive a distorted threat image 326. The distorted threat image 326 is then released and provided to the image display control module 306.

In a specific example of implementation, the reference threat image 324 includes intensity data for a set of coordinates. Applying the certain spatial transformation $T_{H'}^*$ to the intensity data for the set of coordinates in the reference threat image 324 results in modified intensity data for a set of new coordinates. The modified intensity data is released as part of the distorted threat image 326.

Description of Typical Interaction

Figure 4A:
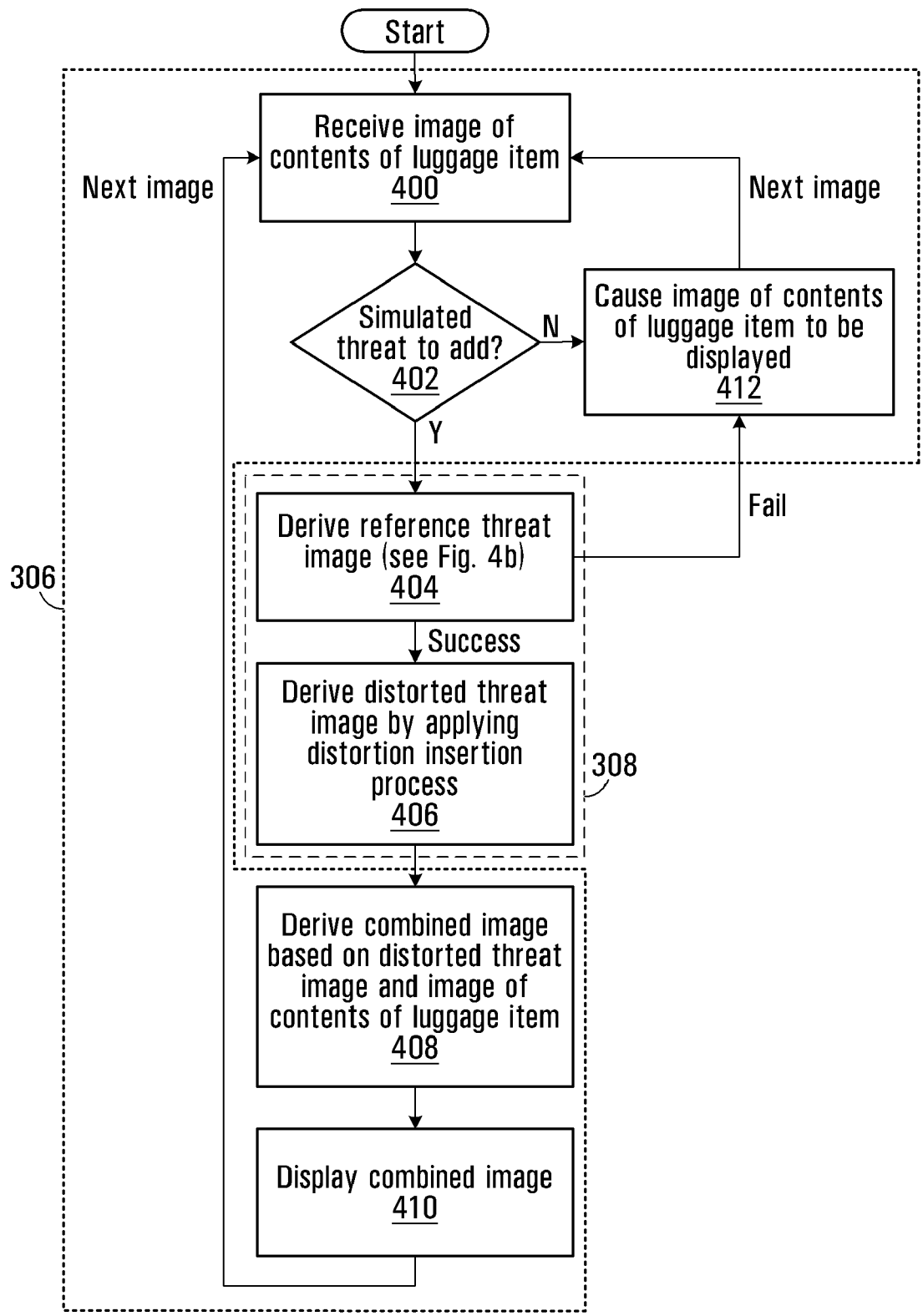
FIG. 4a shows a process implemented by the apparatus shows in FIG. 3 for testing luggage screening equipment operators in accordance with a specific example of implementation of the present invention.
Figure 4B:
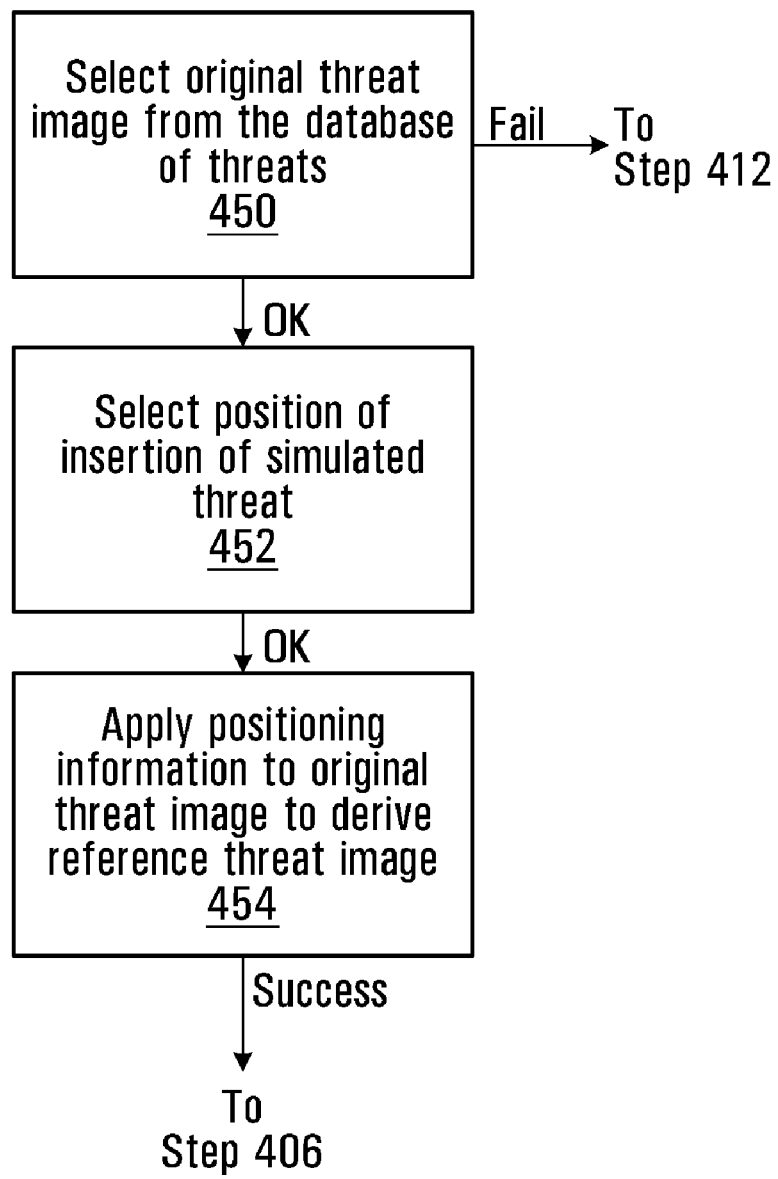
FIG. 4b shows a process for deriving a reference threat image in accordance with a specific example of implementation of the present invention.

A specific example of a process implemented by the apparatus 106 shown in FIG. 3 for testing luggage screening equipment operators will now be described with reference to FIGS. 4a and 4b. For the purpose of increasing the clarity of the description, FIGS. 4a and 4b show which components of apparatus 106 perform the different steps.

At step 400, an image of contents of a luggage item is obtained by the image generation device 104 (shown in FIG. 1) and is provided to the apparatus 106.

At step 402, the image display control module 306 of apparatus 106 makes a decision as to whether a simulated threat should be added to the image received at step 400. The decision as to whether a threat should be added may be based on any suitable decision rule.

If step 402 is answered in the negative in that no simulated threat should be added to the image received at step 400, the image display control module 306 proceeds to step 412. At step 412, the image display control module 306 releases an output signal for causing the display device 108 (shown in FIG. 1) to convey the image of contents of luggage item received at step 400 without the addition of a simulated threat. The system then returns to step 400 once again where a new image of contents of a luggage item is obtained from the image generation device 104 (shown in FIG. 1).

If step 402 is answered in the affirmative in that a simulated threat should be added to the image received at step 400, the image display control module 306 issues a control signal 342 (shown in FIG. 3) to the distorted threat image generation module 308 for causing the latter to initiate step 404.

At step 404, the distorted threat image generation module 308 derives a reference threat image conveying a threat whose presence it to be simulated in the image received at step 400. If step 404 fails and a reference threat image cannot be derived, the distorted threat image generation module 308 issues a threat image selection failure signal to the image display control module 306 for causing the latter to initiate step 412. If a reference threat image is successfully derived, the distorted threat image generation module 308 proceeds to step 406.

In a specific example of implementation, step 404 can be subdivided into steps 450 452 and 454 depicted in FIG. 4b.

More specifically, at step 450, an original threat image is selected from the database of threats 340 (shown in FIG. 3). If step 450 fails, due for example to the inability to select a threat image that will fit within the boundaries of a luggage item, a threat image selection failure signal is generated. The threat image selection failure signal is then transmitted to the image display control module 306 for causing the latter to initiate step 412 (shown in FIG. 4a). If step 450 is successful, it will result in a selected original threat image, which is then provided to step 452.

At step 452, the position in the image received at step 400 where the threat image selected at step 450 is to be inserted is selected. Completion of step 452 results in positioning information, which is then forwarded to step 454.

At step 454, the positioning information is applied to the threat image selected at step 450 to derive a reference threat image. Completion of step 454 results in a reference threat image that corresponds to a repositioned version of the threat image selected at step 450. The reference threat images is then forwarded to step 406 (FIG. 4a).

Returning to FIG. 4a, at step 406, a distorted threat image is derived by applying a distortion insertion process to the reference threat image derived at step 404 to introduce therein a distortion. As described previously, the distortion insertion process tends to approximate the certain distortion introduced by the image generation device 102 (shown in FIG. 1). The distorted threat image is then released by the distorted threat image generation module 308 to the image display control module 306, which is caused to initiate step 408.

At step 408, image display control module 306 derives a combined image based at least in part on the image received at step 400 and the distorted threat image derived at step 406 by the distorted threat image generation module 308.

At step 410, image display control module 306 releases an output signal for causing the display device 108 (shown in FIG. 1) to show a simulated threat in a luggage item by displaying the combined image derived at step 408. The image display control module 306 then returns to step 400 once again where a new image of contents of a luggage item is received.

Advantageously, the above described process allows a more realistic simulation of a threat in a luggage item to be presented to a luggage screening equipment operator by attempting to mimic the distortion introduced by the image generation device 102 in the simulated threat image.

Variant—Pre-Computed Distorted Threat Images

It will be appreciated that, although the above described embodiment of the apparatus 106 has been described as providing distorted threat images by applying a distortion insertion process during the operation of the system, distorted threat images for different (X, Y, Z) locations for a same original threat image may be pre-computed and stored on a computer readable medium.

Figure 5:
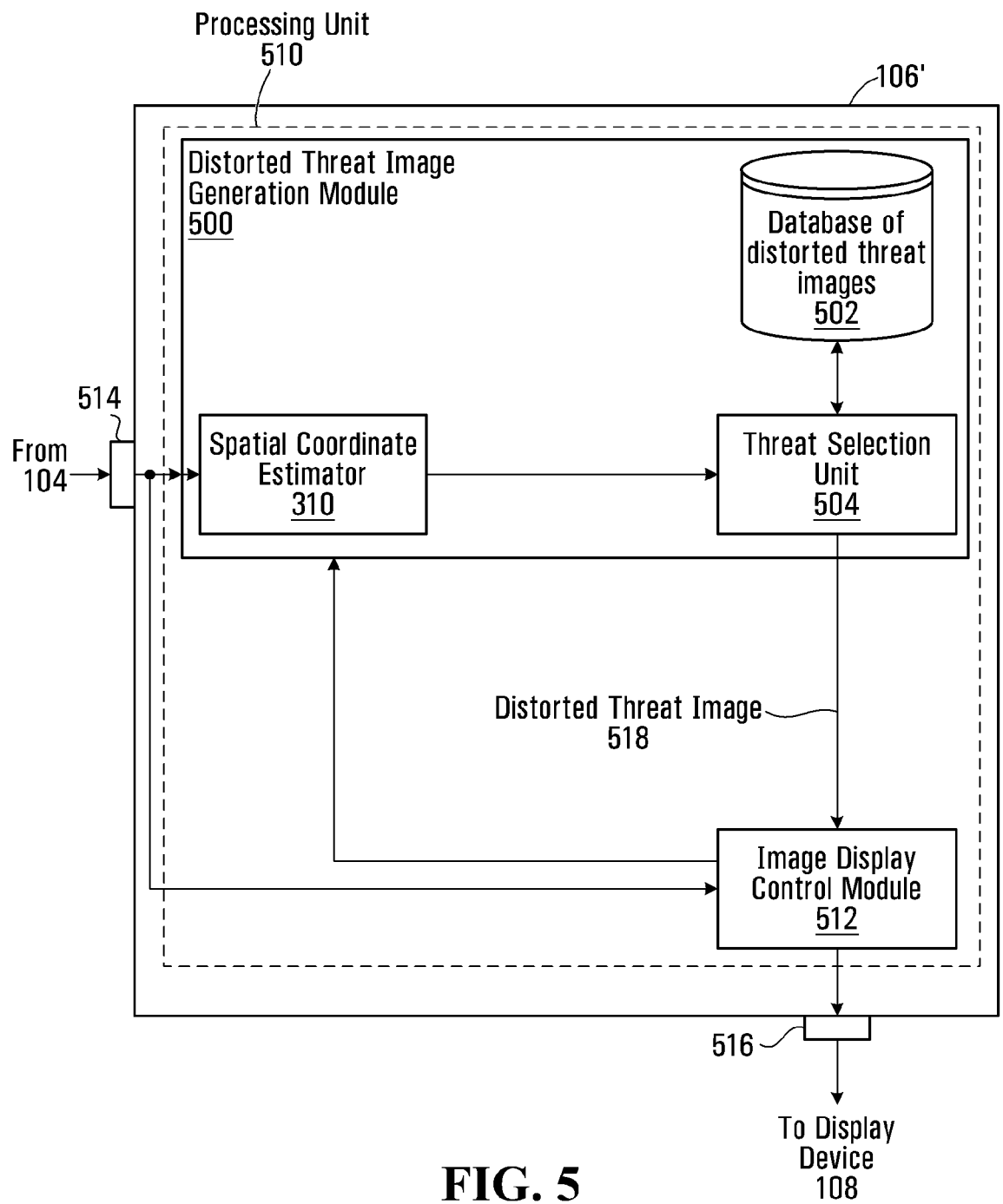
FIG. 5 is a functional block diagram of a apparatus providing threat image projection (TIP) functionality suitable for use in the system shown in FIG. 1 in accordance with an alternative specific example of implementation of the present invention.

An example of such a variant is depicted in FIG. 5 of the drawings as apparatus 106'.

As depicted, the apparatus 106' includes an input 514 and an output 516 analogous to input 302 and output 304 described with reference to FIG. 3. The apparatus 106' also includes a processing unit 510 in communication with the input 514 and the output 516 and releases an output signal for transmission to the display device 108.

As shown, the processing unit 510 comprises a plurality of functional elements including an image display control module 512, analogous to image display control module 306 described with reference to FIG. 3, and a distorted threat image generation module 500.

The distorted threat image generation module 500 is adapted for releasing to the image control module 512 a distorted threat image 518 analogous to distorted threat image 326 described with reference to FIG. 3. In the embodiment shown in FIG. 5, the distorted threat image generation module 500 makes use of information conveyed by the image of contents of a luggage item received at input 514 to generate the distorted threat image 518. As a variant, the distorted threat image generation module 500 is adapted for releasing a threat image selection failure signal (not shown) in cases where a suitable a distorted threat image could not be generated.

In the variant depicted in FIG. 5, the distorted threat image generation module 500 includes a spatial coordinate estimator 520, a threat selection unit 504 and a database of distorted threat images 502.

The spatial coordinate estimator 520 is analogous to spatial coordinate estimator 310 described with reference to FIG. 3.

The database of distorted threat images 502 includes a memory unit for storing a set of distorted threat images associated to potential threats whose presence in luggage items the system 100 (shown in FIG. 1) is designed to simulate. The distorted threat images in the database 502 were derived by applying a distortion insertion process to reference threat images to introduce therein distortions tending to approximate the distortions introduced by the image generation device 102 (shown in FIG. 1). In a specific example of implementation, the set of distorted threat images in the database 502 includes a plurality of subsets, each subset being associated to a respective potential threat. The distorted threat images in a given subset correspond to different positions at which a potential threat is to be simulated. The distorted threat images in the database 502 may be generated for example by the methods described previously in the present specification.

It will be appreciated certain embodiments of the database of threats 502 may include a single subset of distorted threat images associated to a single potential threat, which would allow the system 100 (shown in FIG. 1) to simulate a single potential threat in luggage items. However, practical implementations of the system 100 (shown in FIG. 1) will most likely find it beneficial to include in the database of threats 502 distorted threat images associated to multiple potential threats in order to provide a system capable of simulating different potential threats in luggage items.

The threat selection unit 504 includes functionality similar to that of threat selection unit 312 except that threat selection unit 504 performs the selection process on the database of distorted threat images 502. The threat selection unit 504 selects one or more distorted threat images from the database of distorted threats 502 and releases the selected one or more distorted threat images as signal 518.

Advantageously, by using pre-computed distorted threat images rather than computing the distorted threat images during the operation of the system 100, a reduction in delay and in computational requirements of for the apparatus 106 can be achieved.

Specific Practical Implementation

Figure 8:
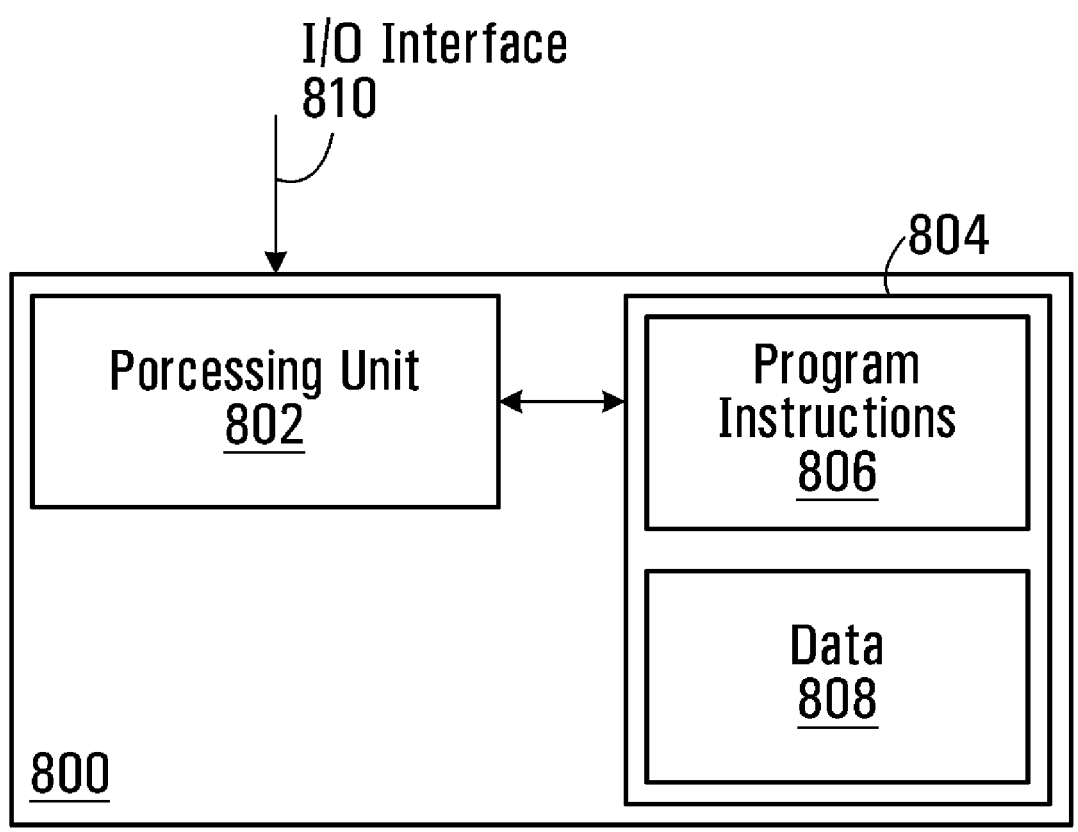
FIG. 8 is a block diagram of an apparatus suitable for implementing a process for testing luggage screening equipment operators in accordance with a specific example of implementation of the present invention.

Those skilled in the art will appreciate that certain portions of the apparatus 106 (shown in FIG. 1) can be implemented on a general purpose digital computer 800, of the type depicted in FIG. 8, including a processing unit 802 and a memory 804 connected by a communication bus. The memory includes data 808 and program instructions 806. The processing unit 802 is adapted to process the data 808 and the program instructions 806 in order to implement the functional blocks described in the specification and depicted in the drawings. The digital computer 800 may also comprise an I/O interface 810 for receiving or sending data elements to external devices.

Alternatively, the above-described apparatus 106 can be implemented on a dedicated hardware platform where electrical components implement the functional blocks described in the specification and depicted in the drawings. Specific implementations may be realized using ICs, ASICs, DSPs, FPGAs or other suitable hardware platform.

It will be appreciated that the screening system 100 (depicted in FIG. 1) may also be of a distributed nature where the images of contents of luggage items are obtained at one location or more locations and transmitted over a network to a server unit implementing the method described above. The server unit may then transmit a signal for causing a display device to display information to the user. The display device may be located in the same location where the images of contents of luggage items were obtained or in the same location as the server unit or in yet another location. In specific examples of implementations, the display device may be a hand-held portable display device or may be part of a user console.

Figure 9:
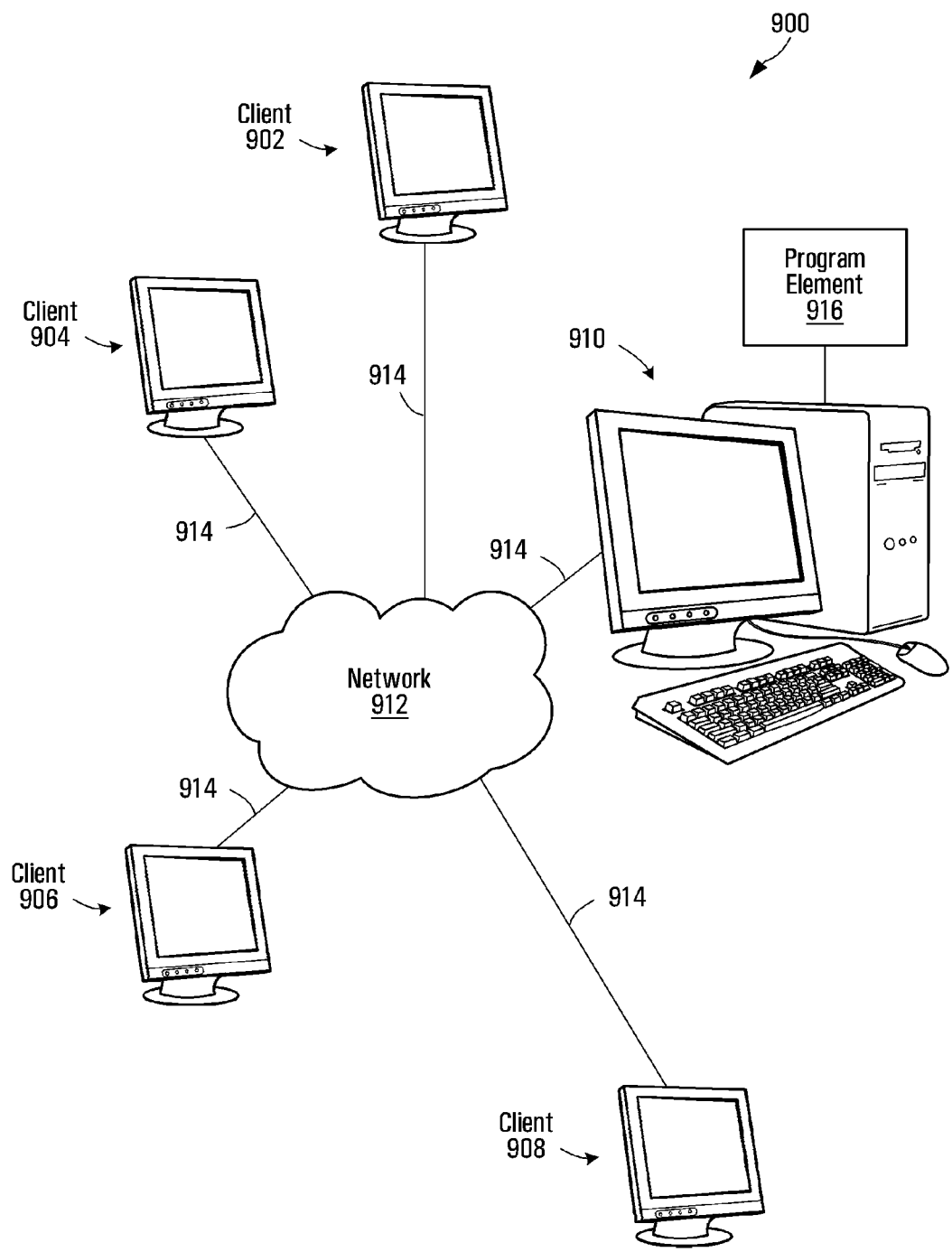
FIG. 9 shows a functional block diagram of a client-server system suitable for implementing a process for testing luggage screening equipment operators accordance with an alternative specific example of implementation of the present invention.

FIG. 9 illustrates a network-based client-server system 900 for system for screening receptacles. The client-server system 900 includes a plurality of client systems 902, 904, 906 and 908 connected to a server system 910 through network 912. The communication links 914 between the client systems 902, 904, 906 and 908 and the server system 910 can be metallic conductors, optical fibres or wireless, without departing from the spirit of the invention. The network 912 may be any suitable network including but not limited to a global public network such as the Internet, a private network and a wireless network. The server 910 may be adapted to process and issue signals concurrently using suitable methods known in the computer related arts.

The server system 910 includes a program element 916 for execution by a CPU. Program element 916 includes functionality to implement the methods described above, including a method for testing luggage screening equipment operators, and includes the necessary networking functionality to allow the server system 910 to communicate with the client systems 902, 904, 906 and 908 over network 912. In a specific implementation, the client systems 902, 904, 906 and 908 include display units responsive to signals received from the server system 910 for displaying information to a user on the basis of messages received from the server system 1110. Certain ones of the clients systems (not shown) may be embodied as image generation devices and may be adapted for sending signal conveying images of contents of luggage items to the server system 910 through network 912.

In a variant, the server system 910 is adapted for receiving images conveying contents of luggage items from a set of image generation devices, the image generation devices is the set having distinct distortion signatures. In such a case, the server system 910 stores respective distortion transformation databases (of the type described with reference to component 314) for each distinct distortion signature in association with the corresponding image generation device in the set. In a specific implementation, the server system 910 includes a memory unit storing a database of threats (of the type described with reference to component 340) whose presence the system is designed to simulate. In this manner it is possible to use a joint database of threats stored by the server system 910 for providing threat image projection functionality for image generation devices having distinct distortion signatures.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A method for testing luggage screening equipment operators, said method comprising:
   a. receiving a sequence of images of contents of luggage items derived from a device that scans the luggage items with penetrating radiation, the device being characterized by introducing a certain distortion into the images of contents of luggage items;
   b. causing a display device to display images derived from the sequence of images of contents of luggage items;
   c. occasionally causing the display device to show a simulated threat in a luggage item by displaying a combined image derived based at least in part on:
      i. an image in the sequence of images; and
      ii. a distorted threat image, the distorted threat image having been derived by applying a distortion insertion process to a reference threat image to introduce a distortion in the reference threat image, wherein the distortion insertion process tends to approximate the certain distortion introduced in the images of contents of luggage items by the device that scans the luggage items with penetrating radiation.

2. A method as defined in claim 1, wherein said method comprises:
   a. occasionally causing the display device to show a same simulated threat positioned at different perceived heights in luggage items by displaying combined images derived based at least in part on:
      i. images in the sequence of images; and
      ii. a group of distorted threat images, the distorted threat images in said group being associated to respective heights and being derived by applying distinct distortion insertion processes to a reference threat image to introduce distortions in the reference threat image, wherein the distinct distortion insertion processes are associated to respective heights.

3. A method for testing luggage screening equipment operators, said method comprising:
  a. receiving a sequence of images of contents of luggage items derived from a device that scans the luggage items with penetrating radiation, the device being characterized by introducing a certain distortion into the images of contents of luggage items;
  b. causing a display device to display images derived from the sequence of images of contents of luggage items;
  c. occasionally causing the display device to show a simulated threat in a luggage item by:
    i. applying a distortion insertion process to a reference threat image to derive a distorted threat image, the distortion insertion process tending to approximate the certain distortion introduced in the images of contents of luggage items by the device that scans the luggage items with penetrating radiation;
    ii. deriving a combined image conveying a simulated threat in the luggage item based at least in part on an image in the sequence of images and the distorted threat image;
    iii. causing the display device to display the combined image.

4. A method as defined in claim 3, said method comprising:
  a. processing the image of contents of the luggage item to derive spatial information associated to the luggage item;
  b. conditioning the distortion insertion process at least in part based on said spatial information.

5. A method as defined in claim 4, wherein the spatial information includes position information associated to the luggage item.

6. A method as defined in claim 5, wherein the position information includes height information associated to the luggage item.

7. A method as defined in claim 4, said method comprising:
  a. providing a set of original threat images wherein the images in said set are associated to respective potential threats;
  b. selecting at least one original threat image from the set of original threat images as the reference threat image.

8. A method as defined in claim 7, wherein selecting at least one image from the set of original threat images as the reference threat image is conditioned at least in part based on the spatial information associated to the luggage item.

9. A method as defined in claim 7, wherein the spatial information associated to the luggage item includes size information, said method comprising selecting at least one image from the set of original threat images as the reference threat image based at least in part on the size information associated to the luggage item.

10. A method as defined in claim 4, said method comprising:
  a. providing an original threat image associated to a threat;
  b. assigning positioning information to the original threat image to derive the reference threat image.

11. A method as defined in claim 10, said method comprising conditioning the distortion insertion process at least in part based on the positioning information assigned to the original threat image to derive the reference threat image.

12. A method as defined in claim 10, wherein the positioning information assigned to the original threat image to derive the reference threat image includes perceived height information, said method comprising conditioning the distortion insertion process at least in part based on the perceived height information.

13. A method as defined in claim 10, wherein assigning positioning information to the original threat image to derive the reference threat image is conditioned at least in part based on the spatial information associated to the luggage item.

14. A method defined in claim 3, wherein the reference threat image includes intensity data for a set of coordinates, wherein the distorted threat image is defined by modified intensity data for a set of new coordinates, and wherein said applying a distortion insertion process comprises applying an image transformation to the intensity data for the set of coordinates to derive said modified intensity data for the new coordinates.

15. A method defined in claim 14, wherein said image transformation involves processing of a data structure representative of an inferred spatial transformation applied by the device that scans the luggage item with penetrating radiation.

16. A method defined in claim 15, wherein said inferred spatial transformation is two-dimensional.

17. A method defined in claim 15, wherein said data structure is characterized by a set of parameters derived from registration of observed coordinates with respect to a set of reference coordinates.

18. A method as defined in claim 3, wherein said method comprises occasionally causing the display device to show a same simulated threat positioned at different perceived heights in luggage items by:
  a. applying distortion insertion processes to a reference threat image to derive a plurality of distorted threat images, the distortion insertion processes being associated to respective heights such that the distorted threat images in the plurality of distorted threat images are associated to respective perceived heights;
  b. deriving combined images conveying the same simulated threat positioned at different perceived heights in luggage items based at least in part on images in the sequence of images and the plurality of distorted threat images;
  c. causing a display device to display at least some of the combined images.

19. A method as defined in claim 3, where said the image of contents of the luggage item derived is an x-ray image.

20. A method as defined in claim 19, wherein deriving the combined image conveying the simulated threat in the luggage includes performing a combination of attenuation information conveyed in the image in the sequence of images and attenuation information conveyed in the distorted threat image.

21. An apparatus for testing luggage screening equipment operators, said apparatus comprising:
  a. an input for receiving a sequence of images of contents of luggage items derived from a device that scans the luggage items with penetrating radiation, the device being characterized by introducing a certain distortion into the images of contents of luggage items;
  b. an output for releasing an output signal suitable for causing a display device to display images derived from the sequence of images of contents of luggage items;
  c. a processing unit in communication with said input and said output, said processing unit being operative for occasionally causing the output signal released at said output to convey a simulated threat in a luggage item by conveying a combined image derived based at least in part on:
    i. an image in the sequence of images; and
    ii. a distorted threat image, the distorted threat image having been derived by applying a distortion insertion process to a reference threat image to introduce a distortion in the reference threat image, wherein the distortion insertion process tends to approximate the certain distortion introduced in the images of contents of luggage items by the device that scans the luggage items with penetrating radiation.

22. An apparatus as defined in claim 21, wherein said processing unit is operative for:
   a. occasionally causing the display device to show a same simulated threat positioned at different perceived heights in luggage items by displaying combined images derived based at least in part on:
      i. images in the sequence of images; and
      ii. a group of distorted threat images, the distorted threat images in said group being associated to respective heights and being derived by applying distinct distortion insertion processes to a reference threat image to introduce distortions in the reference threat image, wherein the distinct distortion insertion processes are associated to respective heights.

23. An apparatus for testing luggage screening equipment operators, said apparatus comprising:
   a. an input for receiving a sequence of images of contents of luggage items derived from a device that scans the luggage items with penetrating radiation, the device being characterized by introducing a certain distortion into the images of contents of luggage items;
   b. an output for releasing an output signal suitable for causing a display device to display images derived from the sequence of images of contents of luggage items;
   c. a processing unit in communication with said input and said output, said processing unit being operative for occasionally causing the output signal released at said output to convey a simulated threat in a luggage item by:
      i. applying a distortion insertion process to a reference threat image to derive a distorted threat image, the distortion insertion process tending to approximate the certain distortion introduced in the images of contents of luggage items by the device that scans the luggage items with penetrating radiation;
      ii. deriving a combined image conveying a simulated threat in the luggage item based at least in part on an image in the sequence of images and the distorted threat image;
      iii. causing the display device to display the combined image.

24. An apparatus as defined in claim 23, said processing unit being operative for:
   a. processing the image of contents of the luggage item to derive spatial information associated to the luggage item;
   b. conditioning the distortion insertion process at least in part based on said spatial information.

25. An apparatus as defined in claim 24, wherein the spatial information includes position information associated to the luggage item.

26. An apparatus as defined in claim 25, wherein the position information includes height information associated to the luggage item.

27. An apparatus as defined in claim 24, wherein said apparatus comprises a memory unit for storing a set of original threat images wherein the images in said set are associated to respective potential threats, said processing unit being operative for selecting at least one image from the set of original threat images in said memory unit as the reference threat image.

28. An apparatus as defined in claim 27, wherein processing unit is operative for selecting at least one image from the set of original threat images as the reference threat image is conditioned at least in part based on the spatial information associated to the luggage item.

29. An apparatus as defined in claim 27, wherein the spatial information associated to the luggage item includes size information, said processing unit being operative for selecting at least one image from the set of original threat images as the reference threat image based at least in part on the size information associated to the luggage item.

30. An apparatus as defined in claim 24, said apparatus comprising a memory unit for storing an original threat image associated to a threat, said processing unit being operative for assigning positioning information to the original threat image to derive the reference threat image.

31. An apparatus as defined in claim 30, said processing unit is operative for conditioning the distortion insertion process at least in part based on the positioning information assigned to the original threat image to derive the reference threat image.

32. An apparatus as defined in claim 30, wherein the positioning information assigned to the original threat image to derive the reference threat image includes desired perceived height information, said processing unit being operative for conditioning the distortion insertion process at least in part based on the perceived height information.

33. An apparatus as defined in claim 30, wherein assigning positioning information to the original threat image to derive the reference threat image is conditioned at least in part based on the spatial information associated to the luggage item.

34. An apparatus defined in claim 23, wherein the reference threat image includes intensity data for a set of coordinates, wherein the distorted threat image is defined by modified intensity data for a set of new coordinates, and wherein said applying a distortion insertion process comprises applying an image transformation to the intensity data for the set of coordinates to derive said modified intensity data for the new coordinates.

35. An apparatus defined in claim 34, wherein said image transformation involves processing of a data structure representative of an inferred spatial transformation applied by the device that scans the luggage item with penetrating radiation.

36. An apparatus defined in claim 35, wherein said inferred spatial transformation is two-dimensional.

37. An apparatus defined in claim 35, wherein said data structure is characterized by a set of parameters derived from registration of observed coordinates with respect to a set of reference coordinates.

38. An apparatus as defined in claim 23, wherein said processing unit is operative for occasionally causing the display device to show a same simulated threat positioned at different perceived heights in luggage items by:
   a. applying distortion insertion processes to a reference threat image to derive a plurality of distorted threat images, the distortion insertion processes being associated to respective heights such that the distorted threat images in the plurality of distorted threat images are associated to respective perceived heights;
   b. deriving combined images conveying the same simulated threat positioned at different perceived heights in luggage items based at least in part on images in the sequence of images and the plurality of distorted threat images;
   c. causing a display device to display at least some of the combined images.

39. An apparatus as defined in claim 23, where said the image of contents of the luggage item derived is an x-ray image.

40. An apparatus as defined in claim 39, wherein deriving the combined image conveying the simulated threat in the luggage includes performing a combination of attenuation information conveyed in the image in the sequence of images and attenuation information conveyed in the distorted threat image.

41. A non-transitory computer readable storage medium storing a program element suitable for execution by a CPU, said program element implementing an apparatus for testing luggage screening equipment operators, said computing apparatus comprising:
  a. a memory unit;
  b. a processor operatively connected to said memory unit, said program element when executing on said processor being operative for:
    i. receiving a sequence of images of contents of luggage items derived from a device that scans the luggage items with penetrating radiation, the device being characterized by introducing a certain distortion into the images of contents of luggage items;
    ii. causing a display device to display images derived from the sequence of images of contents of luggage items;
    iii. occasionally causing the display device to show a simulated threat in a luggage item by displaying a combined image derived based at least in part on:
      1. an image in the sequence of images; and
      2. a distorted threat image, the distorted threat image having been derived by applying a distortion insertion process to a reference threat image to introduce a distortion in the reference threat image, wherein the distortion insertion process tends to approximate the certain distortion introduced in the images of contents of luggage items by the device that scans the luggage items with penetrating radiation.

42. A computer readable storage medium as defined in claim 41, said program element when executing on said processor is operative for occasionally causing the display device to show a same simulated threat positioned at different perceived heights in luggage items by displaying combined images derived based at least in part on:
  i. images in the sequence of images; and
  ii. a group of distorted threat images, the distorted threat images in said group being associated to respective heights and being derived by applying distinct distortion insertion processes to a reference threat image to introduce distortions in the reference threat image, wherein the distinct distortion insertion processes are associated to respective heights.

43. A non-transitory computer readable storage medium storing a program element suitable for execution by a CPU, said program element implementing an apparatus for testing luggage screening equipment operators, said computing apparatus comprising:
  a. a memory unit;
  b. a processor operatively connected to said memory unit, said program element when executing on said processor being operative for:
    i. receiving a sequence of images of contents of luggage items derived from a device that scans the luggage items with penetrating radiation, the device being characterized by introducing a certain distortion into the images of contents of luggage items;
    ii. causing a display device to display images derived from the sequence of images of contents of luggage items;
    iii. occasionally causing the display device to show a simulated threat in a luggage item by:
      1. applying a distortion insertion process to a reference threat image to derive a distorted threat image, the distortion insertion process tending to approximate the certain distortion introduced in the images of contents of luggage items by the device that scans the luggage items with penetrating radiation;
      2. deriving a combined image conveying a simulated threat in the luggage item based at least in part on an image in the sequence of images and the distorted threat image;
      3. causing the display device to display the combined image.

44. A computer readable storage medium as defined in claim 43, wherein said program element when executing on said processor is operative for:
  a. processing the image of contents of the luggage item to derive spatial information associated to the luggage item;
  b. conditioning the distortion insertion process at least in part based on said spatial information.

45. A computer readable storage medium as defined in claim 44, wherein the spatial information includes position information associated to the luggage item.

46. A computer readable storage medium as defined in claim 45, wherein the position information includes height information associated to the luggage item.

47. A computer readable storage medium as defined in claim 44, wherein said program element when executing on said processor being operative for:
  a. providing a set of original threat images wherein the images in said set are associated to respective potential threats;
  b. selecting at least one image from set of original threat images as the reference threat image.

48. A computer readable storage medium as defined in claim 47, wherein selecting at least one image from the set of original threat images as the reference threat image is conditioned at least in part based on the spatial information associated to the luggage item.

49. A computer readable storage medium as defined in claim 47, wherein the spatial information associated to the luggage item includes size information, said program element when executing on said processor being operative for selecting at least one image from the set of original threat images as the reference threat image based at least in part on the size information associated to the luggage item.

50. A computer readable storage medium as defined in claim 44, said program element when executing on said processor being operative for:
  a. providing an original threat image associated to a threat;
  b. assigning positioning information to the original threat image to derive the reference threat image.

51. A computer readable storage medium as defined in claim 50, said program element when executing on said processor being operative for conditioning the distortion insertion process at least in part based on the positioning information assigned to the original threat image to derive the reference threat image.

52. A computer readable storage medium as defined in claim 50, wherein the positioning information assigned to the original threat image to derive the reference threat image includes perceived height information, said program element when executing on said processor being operative for conditioning the distortion insertion process at least in part based on the perceived height information.

53. A computer readable storage medium as defined in claim 50, wherein assigning positioning information to the original threat image to derive the reference threat image is conditioned at least in part based on the spatial information associated to the luggage item.

54. A computer readable storage medium defined in claim 43, wherein the reference threat image includes intensity data for a set of coordinates, wherein the distorted threat image is defined by modified intensity data for a set of new coordinates, and wherein said applying a distortion insertion process comprises applying an image transformation to the intensity data for the set of coordinates to derive said modified intensity data for the new coordinates.

55. A computer readable storage medium defined in claim 54, wherein said image transformation involves processing of a data structure representative of an inferred spatial transformation applied by the device that scans the luggage item with penetrating radiation.

56. A computer readable storage medium defined in claim 55, wherein said inferred spatial transformation is two-dimensional.

57. A computer readable storage medium defined in claim 55, wherein said data structure is characterized by a set of parameters derived from registration of observed coordinates with respect to a set of reference coordinates.

58. A computer readable storage medium as defined in claim 43, wherein said program element when executing on said processor being operative for occasionally causing the display device to show a same simulated threat positioned at different perceived heights in luggage items by:
  a. applying distortion insertion processes to a reference threat image to derive a plurality of distorted threat images, the distortion insertion process approximating a distortion introduced in the images of contents of luggage items by the device that scans the luggage items with penetrating radiation, the distortion insertion processes being associated to respective heights such that the distorted threat images in the plurality of distorted threat images are associated to respective perceived heights;
  b. deriving combined images conveying the same simulated threat positioned at different perceived heights in luggage items based at least in part on images in the sequence of images and the plurality of distorted threat images;
  c. causing a display device to display at least some of the combined images.

59. A computer readable storage medium as defined in claim 43, where said the image of contents of the luggage item derived is an x-ray image.

60. A computer readable storage medium as defined in claim 59, wherein deriving the combined image conveying the simulated threat in the luggage includes performing a combination of attenuation information conveyed in the image in the sequence of images and attenuation information conveyed in the distorted threat image.

61. A system for screening luggage items, comprising:
  a. an image generation device suitable for scanning luggage items with penetrating radiation to generate a sequence of images of contents of the luggage items, the image generation device being characterized by introducing a certain distortion into the images of contents of luggage items;
  b. a display device;
  c. an apparatus in communication with said image generation device and said display device, said apparatus including functionality for testing luggage screening equipment operators, said apparatus comprising:
    i. an input for receiving the sequence of images of contents of luggage items;
    ii. an output for releasing an output signal suitable for causing the display device to display images derived from the sequence of images of contents of luggage items;
    iii. a processing unit in communication with said input and said output, said processing unit being operative for occasionally causing the output signal released at said output to convey a simulated threat in a luggage item by conveying a combined image derived based at least in part on:
      1. an image in the sequence of images; and
      2. a distorted threat image, the distorted threat image having been derived by applying a distortion insertion process to a reference threat image to introduce a distortion in the reference threat image, wherein the distortion insertion process tends to approximates the certain distortion introduced in the images of contents of luggage items by the image generation device.

62. A client-server system for implementing a process for testing luggage screening equipment operators, said client-server system comprising a client system and a server system, said client system and said server system operative to exchange messages over a data network, said server system storing a program element for execution by a CPU, said program element comprising:
  a. first program element component executed on said server system for receiving a sequence of images of contents of luggage items derived from a device that scans the luggage items with penetrating radiation, the device being characterized by introducing a certain distortion into the images of contents of luggage items;
  b. second program element component executed on said server system for generating messages for transmission to said client system for causing a display device in communication with said client system to display images derived from the sequence of images of contents of luggage items;
  c. wherein said second program element component is operative for occasionally generating messages for causing the display device in communication with said client system to show a simulated threat in a luggage item by conveying a combined image derived based at least in part on:
    i. an image in the sequence of images; and
    ii. a distorted threat image, the distorted threat image having been derived by applying a distortion insertion process to a reference threat image to introduce a distortion in the reference threat image, wherein the distortion insertion process approximates the certain distortion introduced in the images of contents of luggage items by the device that scans the luggage items with penetrating radiation.

63. An apparatus for testing luggage screening equipment operators, said apparatus comprising:
  a. means for receiving a sequence of images of contents of luggage items derived from a device that scans the luggage items with penetrating radiation;
  b. means for causing a display device to display images derived from the sequence of images of contents of luggage items;

c. a means for occasionally causing the display device to show a simulated threat in a luggage item by conveying a combined image derived based at least in part on:
  i. an image in the sequence of images; and
  ii. a distorted threat image, the distorted threat image having been derived by applying a distortion insertion process to a reference threat image to introduce a distortion in the reference threat image, wherein the distortion insertion process approximates the certain distortion introduced in the images of contents of luggage items by the device that scans the luggage items with penetrating radiation.

* * * * *